US012069731B2

(12) United States Patent
Hu et al.

(10) Patent No.: US 12,069,731 B2
(45) Date of Patent: Aug. 20, 2024

(54) SYSTEMS, METHODS, AND DEVICES FOR BEAM MANAGEMENT FOR RANDOM ACCESS

(71) Applicant: Samsung Electronics Co., Ltd., Suwon-si (KR)

(72) Inventors: Liang Hu, San Diego, CA (US); Jung Hyun Bae, San Diego, CA (US); Mohammed Karmoose, San Diego, CA (US); Philippe Sartori, Naperville, IL (US)

(73) Assignee: SAMSUNG ELECTRONICS CO., LTD. (KR)

( * ) Notice: Subject to any disclaimer, the term of this patent is extended or adjusted under 35 U.S.C. 154(b) by 178 days.

(21) Appl. No.: 17/407,177

(22) Filed: Aug. 19, 2021

(65) Prior Publication Data

US 2022/0078848 A1 Mar. 10, 2022

Related U.S. Application Data

(60) Provisional application No. 63/093,150, filed on Oct. 16, 2020, provisional application No. 63/076,574, filed on Sep. 10, 2020.

(51) Int. Cl.
*H04W 4/00* (2018.01)
*H04W 72/044* (2023.01)
(Continued)

(52) U.S. Cl.
CPC ..... *H04W 74/0833* (2013.01); *H04W 72/046* (2013.01); *H04W 72/23* (2023.01)

(58) Field of Classification Search
CPC .......... H04W 74/0833; H04W 72/046; H04W 72/23; H04W 72/21; H04W 72/542;
(Continued)

(56) References Cited

U.S. PATENT DOCUMENTS 10,511,370 B2 12/2019 Chang et al.
2018/0048375 A1 2/2018 Guo et al.
(Continued)

OTHER PUBLICATIONS

3GPP TSG-RAN WG1#88bis R1-1704943, Spokane, USA, Apr. 3-7, 2017 (Year: 2017).*
(Continued)

*Primary Examiner* — Atique Ahmed
(74) *Attorney, Agent, or Firm* — Renaissance IP Law Group LLP

(57) ABSTRACT

A method for random access in a communication network may include detecting a first candidate beam at a UE, detecting a second candidate beam at the UE, transmitting, from the UE, one or more first messages of a random access procedure, and indicating, by the one or more first messages, the first candidate beam and the second candidate beam. Another method for random access in a communication network may include detecting a first candidate beam at a UE, detecting a second candidate beam at the UE, receiving, at the UE, traffic information for the first candidate beam and the second candidate beam, selecting the first candidate beam based on the traffic information, and transmitting, based on the selecting, a first message of a random access procedure using the first candidate beam. The traffic information comprises load information.

16 Claims, 9 Drawing Sheets gNB 100
UE 102
SSB 104
MIB/SIB 106
Msg1
RA Preamble on PRACH, RA-RNTI
Msg2
RAR ( TA, TC-RNTI, UL resources for Msg3)
Msg3
PUSCH with Contention Resolution Sequence
Msg4
Contention Resolution Response

(51) Int. Cl.
*H04W 72/23* (2023.01)
*H04W 74/0833* (2024.01)

(58) Field of Classification Search
CPC ............ H04W 74/0841; H04W 74/002; H04L 5/0048; H04L 5/0053; H04L 5/0005; H04B 17/309; H04B 7/0408; H04B 7/088; H04B 7/0695; H04B 7/0456; H04B 7/0617; H04B 7/086
See application file for complete search history.

(56) References Cited

U.S. PATENT DOCUMENTS

| | | | | |
|---|---|---|---|---|
| 2018/0212659 | A1* | 7/2018 | Xiong | H04B 7/0695 |
| 2018/0227772 | A1 | 8/2018 | Yu et al. | |
| 2019/0037426 | A1 | 1/2019 | Yu et al. | |
| 2019/0074880 | A1* | 3/2019 | Frenne | H04B 7/0617 |
| 2019/0104477 | A1* | 4/2019 | MolavianJazi | H04W 72/23 |
| 2019/0182683 | A1* | 6/2019 | Khirallah | H04B 7/0695 |
| 2019/0342769 | A1* | 11/2019 | Li | H04L 27/2646 |
| 2019/0364449 | A1* | 11/2019 | Yang | H04W 72/04 |
| 2020/0014454 | A1 | 1/2020 | Guo et al. | |
| 2020/0053797 | A1* | 2/2020 | Basu Mallick | H04W 74/0808 |
| 2020/0100154 | A1* | 3/2020 | Cirik | H04W 36/305 |
| 2020/0260231 | A1* | 8/2020 | Ganesan | H04B 7/0695 |
| 2020/0267764 | A1* | 8/2020 | Rastegardoost | H04W 72/0446 |
| 2021/0307100 | A1* | 9/2021 | Talebi Fard | H04W 76/18 |
| 2022/0109541 | A1* | 4/2022 | Cirik | H04L 5/0053 |

OTHER PUBLICATIONS

3GPP TSG-RAN WG1#88bis R1-1704943 Spokane, USA, Apr. 3 â 7, 2017 (Year: 2017).*

European Extended Search Report for Application No. 21195725.3, mailed May 16, 2022.

CMCC, "RACH in Gradual UE-Specific (GUS) Initial Access," 3GPP Draft; R1-1609309, 3rd Generation Partnership Project (3GPP), Mobile Competence Centre; 650, Route des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), XP051149354, retrieved from the Internet: URL:http://www.3gpp.org/ftp/Meetings_3GPP_SYNC/RAN1/Docs/ [retrieved on Oct. 9, 2016], 7 pages.

European Partial Search Report for Application No. 21195725.3, mailed Feb. 15, 2022.

Huawei et al., "Beam Refinemerrt During Random Access", 3GPP Draft; R2-1709261 Beam Refinement During Random Access, 3rd Generation Partnership Project (3GPP), Mobile Competence Centre; 650, Route des Lucioles; F-06921 Sophia-Antipolis Cedex; France, vol. RAN WG2, No. Berlin, Germany; Aug. 21, 2017-Aug. 25, 2017, Aug. 20, 2017 (Aug. 20, 2017), XP051319025, Retrieved from the Internet: URL:http://www.3gpp.org/ftp/Meetings_3GPP_SYNC/RAN2/Docs/ [retrieved on Aug. 20, 2017], 2 pages.

Mitsubishi Electric, "RACH Preamble Transmission and Reception,", 3GPP Draft; R1-1611728 Rach, 3rd Generation Partnership Project (3GPP), Mobile Competence Centre; 650, Route des Lucioles; F-06921 Sophia-Antipolis Cedex; France, vol. RAN WG1, No. Reno, Nevada, USA; Nov. 14, 2016-Nov. 18, 2016, Nov. 13, 2016 (Nov. 13, 2016), XP051175698, Retrieved from the Internet: URL:http://www.3gpp.org/ftp/Meetings_3GPP_SYNC/RAN1/Docs/ [retrieved on Nov. 13, 2016], 5 pages.

Nokia et al, "NR Random Access Procedure," 3GPP Draft; R1-1704943_NR Random Access Procedure, 3rd Generation Partnership Project (3GPP), Mobile Competence Centre; 650, Route des Lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), XP051243077, retrieved from the Internet: URL:http://www.3gpp.org/ftp/Meetings_3GPP_SYNC/RAN1/Docs/ [retrieved on Apr. 2, 2017], 11 pages.

ZTE et al., "4-step Random Access Procedure," 3GPP Draft; R1-1701581, 3rd Generation Partnership Project (3GPP), Mobile Competence Centre; 650, Route des Lucioles; F-06921 Sophia-Antipolis Cedex; France, vol. RAN WG1, No. Athens, Greece; Jan. 13, 2017-Jan. 17, 2017, Feb. 12, 2017 (Feb. 12, 2017), XP051208748, Retrieved from the Internet: URL:http://www.3gpp.org/ftp/Meetings_3GPP_SYNC/RAN1/Docs/ [retrieved on Feb. 12, 2017], 13 pages.

* cited by examiner

N
Rx beams

K
Tx beams

| | | | | |
|---|---|---|---|---|
| RS01 | RS05 | RS09 | RS13 | RS17 |
| RS02 | RS06 | RS10 | RS14 | RS18 |
| RS03 | RS07 | RS11 | RS15 | RS19 |
| RS04 | RS08 | RS12 | RS16 | RS20 |

SYSTEMS, METHODS, AND DEVICES FOR BEAM MANAGEMENT FOR RANDOM ACCESS

CROSS-REFERENCE TO RELATED APPLICATIONS

This application claims priority to, and the benefit of, U.S. Provisional Patent Application Ser. No. 63/093,150 titled "Methods and Apparatus for Beam Adaptation in Random Access" filed Oct. 16, 2020 and U.S. Provisional Patent Application Ser. No. 63/076,574 titled "Beam Refinement for Initial Access" filed Sep. 10, 2020, both of which are incorporated by reference.

TECHNICAL AREA

This disclosure relates generally to communication systems, and specifically to systems, methods, and devices for beam management for random access.

BACKGROUND

Wireless communication networks may use beamforming techniques to improve data transmission between devices such as a base station and a user equipment (UE) by creating one or more relatively narrow communication beams between the devices. Beam management techniques such as beam adaptation and beam refinement may be used to further improve the establishment and/or operation of beams between devices. For example, once a relatively wide beam is established between two devices, a beam refinement technique may be used to make the beam narrower which may improve its range, efficiency, throughput, and/or the like.

The above information disclosed in this Background section is only for enhancement of understanding of the background of the invention and therefore it may contain information that does not constitute prior art.

SUMMARY

A method for random access in a communication network may include detecting a first candidate beam at a UE, detecting a second candidate beam at the UE, transmitting, from the UE, one or more first messages of a random access procedure, and indicating, by the one or more first messages, the first candidate beam and the second candidate beam. The first candidate beam and the second candidate beam may be indicated by a first instance of the one or more first messages. The first candidate beam and the second candidate beam may be indicated by a random access channel (RACH) occasion of the first instance of the one or more first messages. The first candidate beam and the second candidate beam are indicated by sending a preamble in the RACH occasion. The method may further include monitoring, at the UE, the first candidate beam and the second candidate beam for a second message of the random access procedure. The method may further include receiving, at the UE, the second message using the first candidate beam. The method may further include sending from the UE, based on receiving the second message using the first candidate beam, a third message of the random access procedure using the first candidate beam. The method may further include selecting, at a base station, the first candidate beam, and sending, from the base station, the second message to the UE using the first candidate beam based on the selecting. The UE is a first UE, the method may further include detecting, at the base station, network traffic for a second UE, and selecting the first candidate beam based on the network traffic for the second UE. The indicating comprises sending, from the UE, the first instance of the one or more first messages using the first candidate beam. The method may further include monitoring, at the UE, the first candidate beam and the second candidate beam for a second message of the random access procedure. The method may further include determining based on the monitoring at the UE, receiving the second message using the first candidate beam or the second candidate beam. The method may further include sending from the UE, based on receiving the second message, a third message of the random access procedure using the first candidate beam. The method may further include receiving, at the UE, a fourth message using the first candidate beam. The method may further include determining, based on the monitoring at the UE, failing to receive the second message. The method may further include sending, from the UE, a second instance of the one or more first messages using the second candidate beam. The method may further include monitoring, at the UE, the second candidate beam for a second message of the random access procedure. The first candidate beam may be indicated by a first instance of the one or more first messages, and the second candidate beam may be indicated by a second instance of the one or more first messages. The method may further include sending, from the UE, the first instance of the one or more first messages using the first candidate beam, and sending, from the UE, the second instance of the one or more first messages using the second candidate beam. The method may further include monitoring, at the UE, the first candidate beam and the second candidate beam for a second message of the random access procedure. The method may further include receiving, at the UE, the second message using the first candidate beam. The method may further include sending from the UE, based on receiving the second message using the first candidate beam, a third message of the random access procedure using the first candidate beam. The method may further include selecting, at a base station, the first candidate beam, and sending, from the base station, the second message to the UE using the first candidate beam based on the selecting. The UE may be a first UE, the method may further include detecting, at the base station, network traffic for a second UE, and selecting the first candidate beam based on the network traffic for the second UE. The second message is a first instance of the second message, the method may further include receiving, at the UE, a second instance of the second message using the second candidate beam. The method may further include selecting the first candidate beam based on receiving the first instance of the second message and the second instance of the second message, and sending from the UE, based on the selecting, a third message of the random access procedure using the first candidate beam. The method may further include decoding, at a base station, the first instance of the first message, and sending, from the base station to the UE, the first instance of the second message based on decoding the first instance of the first message. The method may further include decoding, at the base station, the second instance of the first message, and sending, from the base station to the UE, the second instance of the second message based on decoding the second instance of the first message.

A method for random access in a communication network may include detecting a first candidate beam at a UE, detecting a second candidate beam at the UE, receiving, at the UE, traffic information for the first candidate beam and the second candidate beam, selecting the first candidate beam based on the traffic information, and transmitting, based on the selecting, a first message of a random access procedure using the first candidate beam. The traffic information may include load information. The traffic information may include priority information. Selecting may include selecting the first candidate beam based on an idle condition of the first candidate beam. The UE is a first type of UE, and the selecting may include selecting the first candidate beam based on a second type of UE using the second candidate beam. The first type of UE may include a reduced capacity (RedCap) UE, and the second type of UE may include an enhanced mobile broadband (eMBB) UE.

A method for random access in a communication network including receiving, at a user equipment (UE), a pattern of reference signals, wherein the pattern may be based on a first transmit beam and a second transmit beam, measuring, at the UE, two or more reference signals of the pattern of reference signals, selecting the first transmit beam based on measuring the two or more reference signals, sending, from the UE, a connection request message of a random access procedure, wherein the message indicates the first transmit beam. The method may further include receiving at the UE, by the first transmit beam, a contention resolution message of the random access procedure. The pattern may be based on a first receive beam and a second receive beam, the method may further include selecting the first receive beam based on measuring the two or more reference signals. The contention resolution message may be received at the UE by the first receive beam. The method may further include receiving measurement configuration information at the UE, wherein measuring the two or more reference signals may be based on the measurement configuration information. The method may further include determining, at the UE, a transmit broad beam, wherein the first and second transmit beams are narrow transmit beams corresponding to the transmit broad beam. The measurement configuration information may be received in a system information block (SIB). The measurement configuration information may include quasi-colocation (QCL) information for the two or more reference signals based on QCL information for the transmit broad beam. The pattern of reference signals may include a pattern of synchronization signal block signals. The pattern of reference signals may include a pattern of channel state information reference signals (CSI-RS). The pattern of reference signals may include a pattern of random access response (RAR) messages. The receiving may include receiving a first instance of the pattern of reference signals, the measuring may include measuring a first instance of the two or more reference signals; the method may further include receiving, at the UE, a second instance of the pattern of reference signals, measuring, at the UE, a second instance of the two or more reference signals; and the selecting may be further based on measuring the second instance of the two or more reference signals.

A method for random access in a communication network may include transmitting, from a user equipment (UE), a pattern of reference signals, wherein the pattern of reference signals may be based on a first transmit beam and a second transmit beam, and receiving at the UE, a response message of a random access procedure, wherein the response message may include an indication selecting the first transmit beam. The method may further include sending, from the UE, a connection request message of the random access procedure by the first transmit beam. The method may further include selecting, based on the first transmit beam, a UE receive beam. The UE receive beam may be selected based on correspondence with the first transmit beam. The method may further include receiving, at the UE, a contention resolution message by the UE receive beam. Transmitting the pattern of reference signals may include transmitting a first instance of a request message of the random access procedure by the first transmit beam, and transmitting a second instance of the request message by the second transmit beam. The method may further include receiving configuration information at the UE, wherein transmitting the pattern of reference signals may be based on the configuration information. The configuration information may be received in a system information block (SIB). The configuration information may include resources for transmitting the pattern of reference signals. The resources may include frequency and time resources for a physical random access channel (PRACH). The method may further include determining, at the UE, a transmit broad beam of a base station, wherein the first transmit beam and the second transmit beam are narrow transmit beams corresponding to the transmit broad beam. The configuration information may include quasi-colocation (QCL) information for the pattern of reference signals based on QCL information for the transmit broad beam. The method may further include receiving, at a base station, two or more reference signals of the pattern of reference signals, measuring, at the base station, the two or more reference signals of the pattern of reference signals, selecting the first transmit beam based on the measuring, and sending from the base station, based on the selecting, the response message to the UE. The transmitting may include transmitting a first instance of the pattern of reference signals, the receiving may include receiving a first instance of the two or more reference signals, the measuring may include measuring the first instance of the two or more reference signals; the method may further include: transmitting, from the UE, a second instance of the pattern of reference signals, receiving, at the base station, a second instance of the two or more reference signals, and measuring, at the base station, the second instance of the two or more reference signals; and the selecting may be further based on measuring the second instance of the two or more reference signals. The transmitting may include transmitting a first instance of the pattern of reference signals, the receiving may include receiving a first instance of the two or more reference signals, the measuring may include measuring the first instance of the two or more reference signals; the method may further include transmitting, from the UE, a second instance of the pattern of reference signals, receiving, at the base station, a second instance of the two or more reference signals, and measuring, at the base station, the second instance of the two or more reference signals; and the selecting may be further based on measuring the second instance of the two or more reference signals. The method may further include transmitting the pattern of reference signals based on precoding information, and receiving, at the UE, the precoding information.

A method for random access in a communication network may include receiving, at a base station, a first message of a random access procedure, determining a quality of the first message, and sending from the base station, based on the quality of the first message, a second message of the random access procedure, wherein the second message may include measurement configuration information for a beam refinement procedure. The method may further include performing the beam refinement procedure based on the measurement configuration information. The method may further include determining a selected transmit beam based on the beam refinement procedure, and sending from the base station, by the selected transmit beam, a contention resolution message of the random access procedure.

A method for random access in a communication network may include transmitting, from a base station, a first reference signal by a first transmit narrow beam, transmitting, from the base station, a second reference signal by a second transmit narrow beam, and receiving, at the base station, a first message of a random access procedure, wherein the first message may include an indication selecting the first transmit narrow beam. The first reference signal may be mapped to a first random access channel (RACH) occasion, and the second reference signal may be mapped to a second RACH occasion. The method may further include receiving, at a user equipment (UE), the first reference signal and the second reference signal, measuring, at the UE, the first reference signal and the second reference signal, selecting, at the UE, the first transmit narrow beam based on the measuring, and sending, from the UE, the first message of the random access procedure based on the selecting.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

Figure 1:
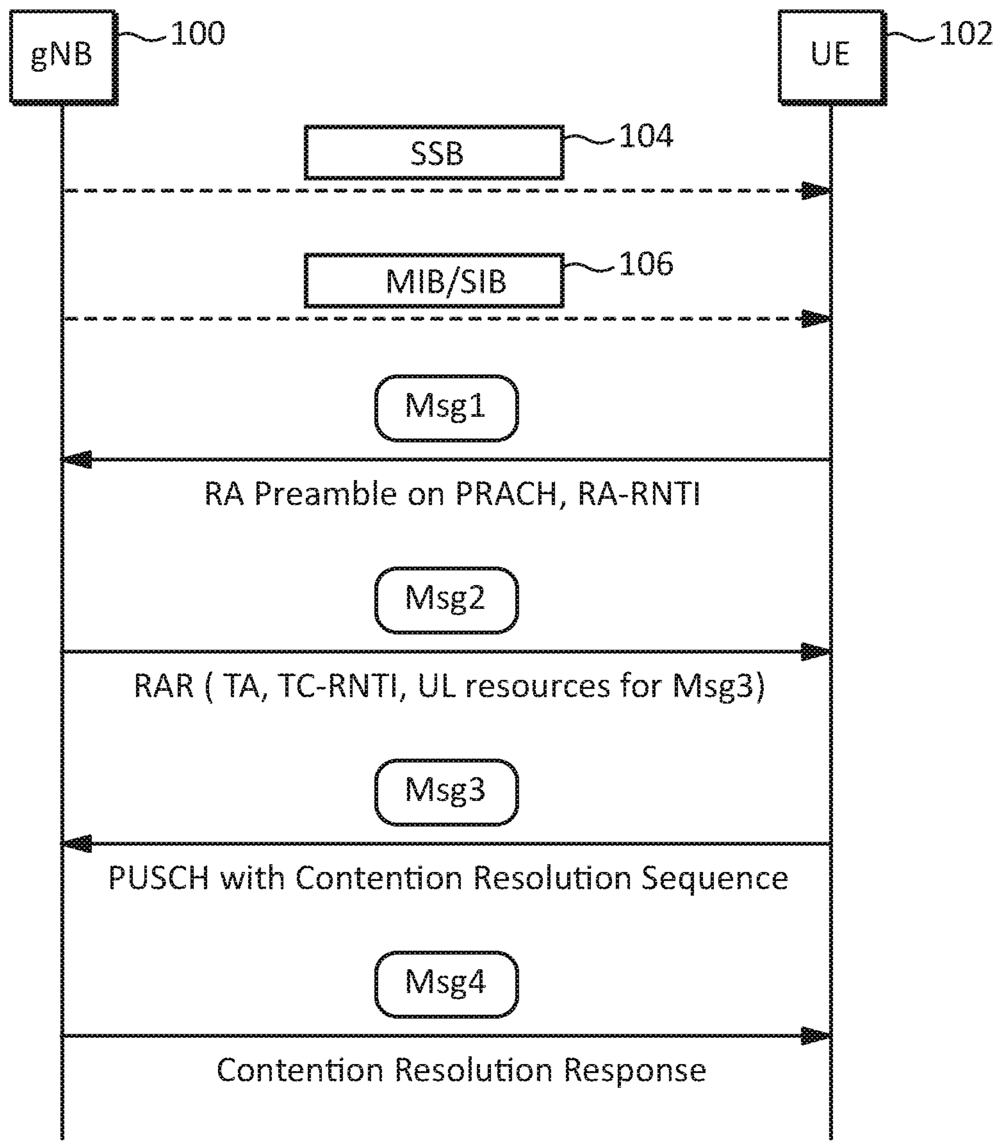
FIG. 1 illustrates an embodiment of a 4-step random access procedure in accordance with this disclosure.

This disclosure encompasses numerous inventive principles relating to beam management for random access. These principles may have independent utility and may be embodied individually, and not every embodiment may utilize every principle. Moreover, the principles may also be embodied in various combinations, some of which may amplify the benefits of the individual principles in a synergistic manner.

Some of the principles of this disclosure relate to techniques for beam adaptation during a random access procedure. In some of these techniques, a UE may use a request message (e.g., Msg1) of a random access procedure to indicate beams (e.g., SSB beams) that the UE has determined to be good.

In some first embodiments of methods for beam adaptation, a single instance of the request message may be used to indicate multiple good beams. For example, a UE may send a Msg1 to a base station at a RACH occasion (RO) that has been mapped to a set of good SSB beams detected by the UE. The UE may use one of the good beams to transmit Msg1 to the base station. The UE may then monitor the set of beams for Msg2. In some scenarios, the base station may select one of the beams indicated by the RO and notify the UE of the selected beam by using the selected beam to send a Msg2 to the UE. Thus, the UE may be informed of the selected beam by decoding Msg2 on the selected beam, and the UE and base station may use the selected beam for further messaging during the RACH procedure. Depending on the implementation details, this may enable the base station to perform load balancing across multiple beams.

In some other scenarios using the first embodiments, if the UE detects a Msg2 using any of the set of beams, the UE may select the beam used to send the Msg1 for further transmissions by the UE and the base station. If, however, the UE does not detect Msg2 on any of the beams indicated by the RO, the UE may assume the beam used to send Msg1 is no longer good. The UE may then retransmit Msg1 to the base station using different beams of the set of beams until the UE decodes a Msg2 from the base station. The UE may then select the beam on which it most recently transmitted Msg1 for further transmissions by the UE and the base station.

In some second embodiments of methods for beam adaptation, a UE may send multiple instances of the request message of a random access procedure, wherein each instance may indicate a good beam detected by the UE. For example, a UE may send repetitions of Msg1, wherein, for each repetition the UE may send the Msg1 using a different SSB beam from a set of beams detected as good by the UE. The UE may then monitor the set of beams for Msg2. In some scenarios using the second embodiments, the base station may select one of the beams on which it received Msg1 to notify the UE of the selected beam by using the selected beam to send a Msg2 to the UE. Thus, the UE may be informed of the selected beam by decoding Msg2 on the selected beam, and the UE and base station may use the selected beam for further messaging during the RACH procedure. Depending on the implementation details, this may enable the base station to perform load balancing across multiple beams.

In some other scenarios using the first embodiments, the UE may send a Msg2 to the UE on each SSB beam on which it decodes Msg1. The UE may then select one of the beams on which it decodes Msg2 for further transmissions by the UE and the base station.

In some third embodiments of methods for beam adaptation, a base station may provide to a UE traffic information (e.g., load and/or priority information) for some or all beams that may be used by the UE. After determining which of the beams are good beams, the UE may use the traffic information to select one of the good beams for further transmissions by the UE and the base station. For example, the UE may select a beam that may be idle, or a beam that may avoid congestion with other high priority traffic. The UE may then indicate to the base station which beam it has selected using Msg1.

Some of the principles of this disclosure relate to techniques for beam refinement during a random access procedure.

In some first embodiments of beam refinement during a random access procedure, a base station may send a pattern of reference signals for beam sweeping. The pattern of reference signals may enable transmit (Tx) narrow beam sweeping and receive (Rx) narrow beam sweeping. The pattern of reference signals may sweep the Tx narrow beams corresponding to a Tx broad beam (e.g., an SSB beam) that has been selected by a UE. The reference signals may include SSB signals, channel state information reference signals (CSI-RS), repetitions of random access response (RAR) messages, and/or the like. The UE may measure the reference signals using measurement configuration information received from the base station, for example, in a system information block (SIB). The UE may select a Tx narrow beam and/or an Rx narrow beam based on the measurements, for example, using beam correspondence. The UE may report the selected Tx narrow beam to the base station using a contention message (e.g., Msg3). The base station may then transmit a contention resolution message (e.g., Msg4) using the selected Tx narrow beam, and/or the UE may receive the contention resolution message using the selected Rx narrow beam.

In some second embodiments of beam refinement during a random access procedure, a UE may send a pattern of reference signals that may be used for Tx and Rx narrow beam sweeping. The base station may provide the UE with beam configuration information that may include resources (e.g., frequency and time resources for a physical random access channel (PRACH)) for UE Tx narrow beam sweeping. The UE may sweep the Tx narrow beam by transmitting Msg1 in repetition as a reference signal using the resources. The base station may measure the Msg1 repetitions and select a UE Tx narrow beam based on the measurements. The base station may also select a base station Rx narrow beam based on the measurements of the Msg1 in repetitions. The base station may then notify the UE of the selected UE Tx narrow beam, for example, using Msg2. The UE may select a UE Rx narrow beam based, for example, on correspondence with the UE Tx narrow beam selected by the base station. The base station may select a base station Tx narrow beam based, for example, on correspondence with the base station Rx narrow beam. The base station may then transmit a contention resolution message (e.g., Msg4) using the selected base station Tx narrow beam, and/or the UE may receive the contention resolution message using the selected UE Rx narrow beam.

In some third embodiments of beam refinement during a random access procedure, a base station may decide whether to perform a beam refinement based on the quality of a Msg1 received from a UE. If the base station decides to perform a beam refinement, it may transmit measurement configuration information to the UE, for example, using Msg2. The beam refinement may then proceed, for example, as in any of the first embodiments or second embodiments of beam refinement during a random access procedure described above.

In some fourth embodiments of beam refinement during a random access procedure, a base station may sweep narrow beam reference signals prior to receiving a Msg1. The beam sweeping may be based, for example, on mapping between reference signals and RACH occasions. A UE may select one of the narrow beams and indicate the selected beam to the base station, for example, by using a corresponding preamble and/or RACH occasion to send Msg1 to the base station.

In some embodiments, a beam may refer to a signal (e.g., a reference signal) that may be precoded with beamforming information. For example, in some first embodiments of beam refinement described above (e.g., base station based beam refinement), a beam may refer to a reference signal (RS) such as a synchronization signal block (SSB) or a channel state information reference signal (CSI-RS) that may be precoded with beamforming weights (which may also be referred to as coefficients). A different set of beamforming weights may be applied to each RS resource to generate a different directional beam for each RS resource. As another example, in some second embodiments of beam refinement described above (e.g., UE based beam refinement), a physical random access channel (PRACH) may be used as a reference signal. In some embodiments, each RS resource may uniquely identify quasi-colocation (QCL) and/or transmission control information (TCI) state information of a Tx narrow beam.

Some example embodiments of systems, apparatus, devices, processes, methods, and/or the like illustrating some possible implementation details according to this disclosure are described herein. These examples are provided for purposes of illustrating the principles of this disclosure, but the principles are not limited to or defined by these embodiments, implementation details, and/or the like. For example, some embodiments may be described in the context of 5G and/or New Radio (NR) wireless communication systems, but the principles may also be applied to any other types of communication systems including 3G, 4G and/or future generations of wireless networks, and/or any other communication systems. Moreover, some embodiments may be described in the context of specific applications and/or problems they may alleviate, but the principles are not limited to these contexts, and some embodiments may not be applicable to these contexts.

Random Access Procedure

FIG. 1 illustrates an embodiment of a 4-step random access procedure in accordance with this disclosure. The embodiment illustrated in FIG. 1 may be used, for example, to implement any of the beam management techniques including beam adaptation and/or beam refinement techniques disclosed herein.

Referring to FIG. 1, prior to the start of a random access (RA) procedure, a base station 100, which in this embodiment may be implemented as a next generation node B (gNB), may broadcast one or more synchronization signal blocks (SSBs) 104 to any UEs within range such as UE 102. An SSB 104 may include, for example, synchronization signals (SSs) such as a primary synchronization signal PSS, and a secondary synchronization signal (SSS), as well as a physical broadcast channel (PBCH). In some embodiments, the one or more SSBs may be transmitted as beams (e.g., wide beams) and/or may be used as reference signals.

Also prior to the start of an RA procedure, the base station 100 may broadcast system information 106 to any UEs within range such as UE 102. The system information 106 may include, for example, a master information block (MIB) and one or more system information blocks (SIBs). The MIB and/or SIB transmissions may include fundamental system information that a UE may use to communicate over the wireless network including information about the configuration of the RA procedure.

A random access message exchange may be initiated by the UE 102 when it transmits a first message (Message 1 or Msg1) including a random access preamble to the gNB 100 on a PRACH which may be configured by the system information in the MIB/SIB. This may involve the use of a random access radio network temporary identifier (RA-RNTI) to identify the time-frequency resource used by the UE to transmit the random access preamble. In some embodiments, Msg1 may be characterized as a random access request, and thus may be referred to more generally as a request message.

After receiving Msg1, the gNB 100 may use the random access preamble to allocate resources for the UE 102 to use to transmit Msg3 to the gNB 100 through a physical uplink shared channel (PUSCH). The gNB 100 may then transmit a second message (Msg2) back to the UE 102. Msg2 may be a random access response (RAR) which may include a grant of uplink (UL) resources such as PUSCH time/frequency resources that the UE 102 may use to transmit Msg3, and/or a Temporary C radio network temporary identifier (TC-RNTI) which may be used by the UE 102 for the rest of the RA procedure. In some embodiments, Msg2 may be referred to more generally as a response message.

After receiving Msg2, the UE 102 may transmit Msg3 to the gNB 100 using the PUSCH resources allocated by the uplink grant received in Msg2. Thus, the PUSCH transmission of Msg3 may be scheduled by the gNB 100 based on the grant of uplink resources. The data payload in Msg3 may contain, for example, a contention resolution sequence and may be implemented as a radio resource control (RRC) connection request message. In some embodiments, Msg3 may be referred to more generally as a connection request message.

After receiving Msg3, the gNB 100 may then respond by sending a fourth message (Msg4) including a contention resolution response to the UE 102. Msg4 may include, for example, the same contention resolution sequence sent by the UE 102. After receiving Msg4, the UE 102 may confirm that the contention resolution sequence sent by the gNB 100 is the same sequence it sent in Msg3. If the sequences match, the UE 102 may consider itself connected and promote the temporary identifier TC-RNTI to the dedicated UE identifier C-RNTI. In some embodiments, Msg4 may be referred to more generally as a contention resolution message.

Beam Adaptation in Random Access

In some scenarios, multiple UEs may attempt to connect to a network at the same time. (These may be referred to as first scenarios.) For example, multiple (e.g., many) UEs such as reduced capacity (RedCap) and/or Internet of things (IoT) UEs may be connected to, and/or in range of, the same cell and/or beam of a network. Some of these UEs may attempt to access the network at the same time (e.g., using a random access channel (RACH)) which may cause RACH overloading and/or congestion. This may be particularly true for stationary devices such as IoT sensors. Moreover, congestion on these beams and/or cells may be concentrated at certain times and/or during certain events as in the following examples:

(1) Many network-connected bicycles may be parked in the same location and may be unlocked through the network at almost the same time (e.g., during rush hour).

(2) Co-located IoT cameras and/or industrial sensors may be scheduled to upload data to the network at the same specified time.

In these and other types of scenarios, a large number of UEs such as RedCap and/or IoT UEs may use all or nearly all available physical random access channel (PRACH) resources, thereby causing temporary congestion, collisions, and/or delays while attempting to connect to the network. This may leave other UEs such as enhanced mobile broadband (eMBB) UEs unable to connect to the network.

Figure 2:
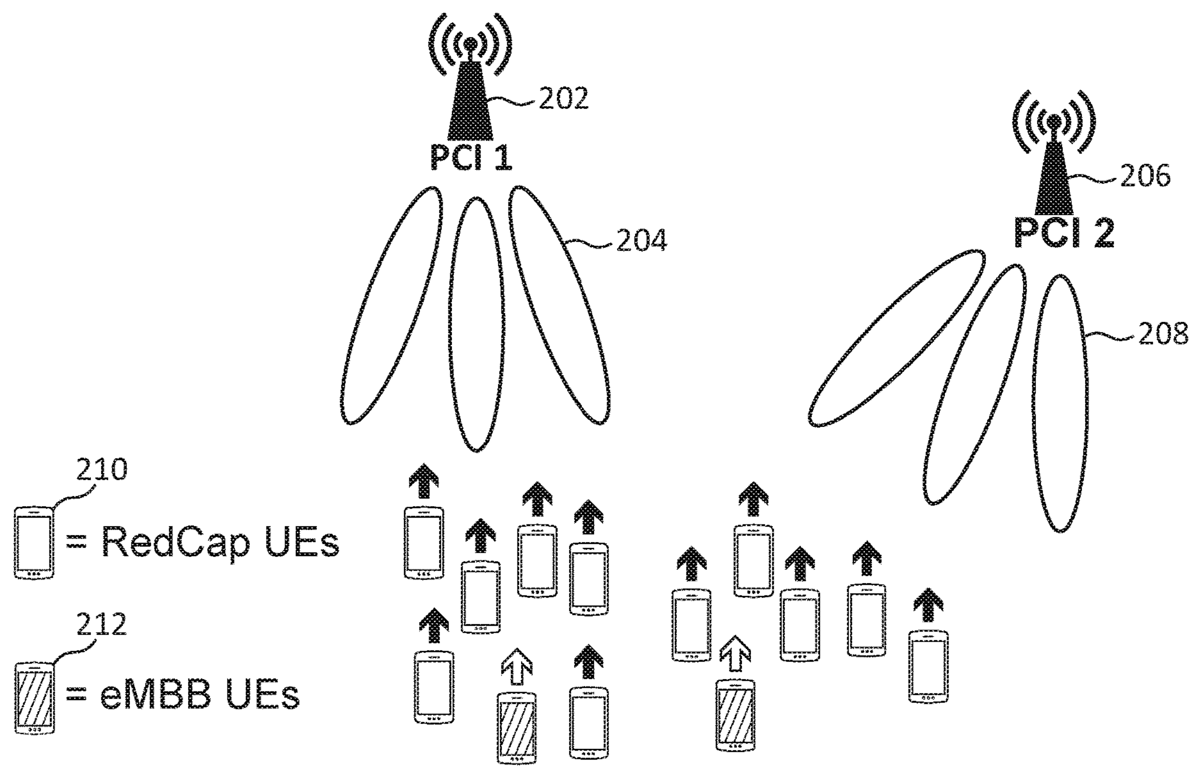
FIG. 2 illustrates an example embodiment of a network experiencing congestion caused by multiple UEs atternpting to access the network simultaneously.

FIG. 2 illustrates an example embodiment of a network experiencing congestion caused by multiple UEs attempting to access the network simultaneously. In the embodiment illustrated in FIG. 2, the network may include cells 202 and 206 indicated by physical cell identifiers (PCIs) PCI 1 and PCI 2, respectively. The cells 202 and 206 may communicate using beams 204 and 208, respectively. RedCap UEs 210 (indicated by unshaded screens) may be attempting to simultaneously access the network and therefore using all or nearly all available PRACH resources. Thus, eMBB UEs 212 (indicated by shaded screens) may be unable to connect.

NR specifications may provide a backoff indicator (BI) mechanism that may be used in cases of congestion and/or collision as described above. The BI mechanism may be invoked by a random access response (RAR) message (e.g., Msg2) of a random access procedure. However, the BI mechanism is time based, and thus, it may not help alleviate congestion when an entire beam is overloaded. Moreover, the BI mechanism is a reactive mechanism that may not be invoked until after a collision occurs, thus it may be too late to alleviate network congestion.

In some scenarios (which may be referred to as second scenarios), a beam sweep may have a relatively long latency. Thus, a UE may detect a good beam during a beam sweep operation, but the beam may no longer be good by the time the UE attempts to use it for a random access procedure, for example, if the UE is moving and/or the environment changes. this may lead to failure of any of Msg1 through Msg4 in a RACH phase. A relatively large beam sweeping latency may occur, for example, with NR-Unlicensed spectrum in the 60 GHz band due to uncertainty associated with listen before talk (LBT) in wide and/or narrow beam sweeping.

In some embodiments in accordance with this disclosure, one or more methods for beam adaptation in random access may improve the performance, for example, by preventing delays, reducing unnecessary UE power consumption, and/or the like, in the first, second, and/or other scenarios.

Figure 3:
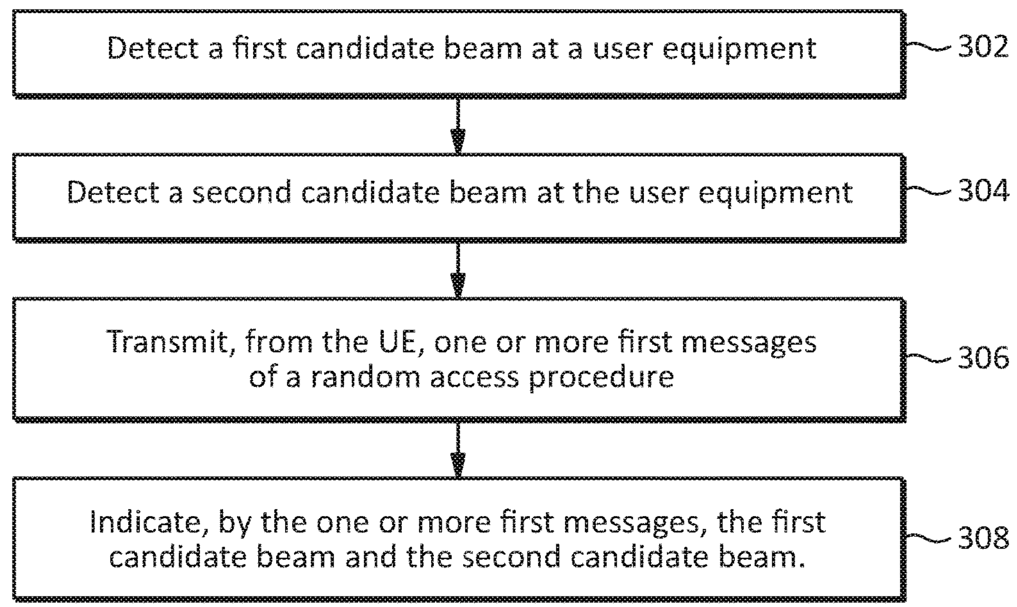
FIG. 3 illustrates an embodiment of a beam adaptation method for a random access procedure in accordance with this disclosure.

FIG. 3 illustrates an embodiment of a beam adaptation method for a random access procedure in accordance with this disclosure. The embodiment illustrated in FIG. 3 may be used, for example, to implement any of the beam adaptation methods disclosed herein.

At operation 302, the method may detect a first candidate beam at a UE. A candidate beam may be, for example, an SSB beam (e.g., a wide beam) transmitted by a base station and detected as good by the UE. At operation 304, the method may detect a second candidate beam at the UE. Thus, the UE may have identified two good SSB beams. At operation 306, the method may transmit, from the UE, one or more first messages of a random access procedure. For example, the UE may transmit one or more instances of Msg1 to the base station. At operation 308, the method may indicate, by the one or more first messages, the first candidate beam and the second candidate beam. Thus, the UE may inform the base station of the two or more good SSB beams it has detected. In some embodiments, the UE and/or base station may then select one of the good SSB beams according to one or more beam adaptation methods described herein.

1.0 First Embodiments: Beam Adaptation with Msg1 Corresponding to Multiple Candidate Beams

1.1 First Scenario

Some first embodiments may be applicable, for example, to one of the first scenarios described above in which multiple UEs may attempt to access a network at the same time. Thus, for purposes of illustration, some first embodiments may be described in the context of these scenarios. However, these embodiments may be applied in other contexts and/or scenarios as well, and are not limited to any particular contexts and/or scenarios.

In some embodiments, multiple RedCap UEs may detect more than one good SSB beam. In some implementations, each RedCap UE may randomly select one good SSB beam. However, depending on the implementation details, this may lead to suboptimal results, for example, because the existing load across different good SSB beams may be non-uniform. For example, one of the good SSB beams detected by a UE may already have one or more (in some cases many) existing eMBB UEs whereas one of the other good SSB beams detected by the UE may be idle. The UE may not be aware of the existence of other UEs on one of the good beams, whereas the network (NW) and/or base station (e.g., gNB) may have a global view of the traffic on all beams. In this type of situation, better results may be obtained by allocating the RedCap UE to an idle SSB beam rather than allowing the RedCap UE to uniformly and/or randomly select one of the good SSB beams it detected.

Moreover, having the NW select a good SSB beam for the RedCap UE may provide the NW with flexibility to implement intelligent traffic steering and/or prioritization of RedCap UE and eMBB UE traffic. This type of traffic management scheme may take into consideration different quality of service (QoS) specifications or requirements of RedCap traffic (which may have low QoS requirements), eMBB traffic (which may have medium QoS), or ultra-reliable low-latency communications (URLLC) traffic (which may have high QoS), and/or the like. For example, a RedCap UE may be allocated to a good SSB beam where there may be fewer eMBB UEs. Depending on the implementation details, this may enable the RedCap UE to avoid the RACH congestion associated with eMBB UEs.

In some embodiments, RACH occasions (ROs) may be mapped to sets of SSB beams. Thus, in some embodiments as described below, an RO may be used to indicate which SSB beams the UE has detected as being good. Depending on the implementation details, a RedCap UE may always find an RO that is mapped to the group of SSBs that a particular RedCap may have identified as good based on the measurements performed by the UE. For example, assuming two SSBs are configured per RO, if an RO pool contains ROs having all of the combinations of two different SSBs, then the UE may always find the RO having the correct combination of SSB beams.

In some implementations, an RO pool may only contain limited combinations of two different SSBs. For example, a pool may contain a limited number of limited combinations that may be grouped based on past experience from network planning, such as neighboring SSB beams may be grouped since their quality may tend to be correlated. In such implementations, the UE may not always find an RO corresponding to the exact combination of good beams, but it may still be very likely, and therefore, depending on the implementation details, the benefit of a smaller RO pool may outweigh the occasional inexact RO selection.

In some embodiments, if a RedCap UE only detects one good SSB beam, it may opt to follow a legacy RACH procedure, for example, along with one or more eMBB UEs.

A detailed example embodiment of a beam adaptation method may proceed as follows.

(Phase 1) Different UEs (e.g., eMBB and RedCap UEs) that have detected more than one good SSB beam may be separated into different initial bandwidth parts (BWPs) and/or different RACH occasion (RO) pools. In some embodiments, RedCap UEs with only one detected good SSB beam may be placed in an initial BWP and/or RO pool with eMBB UEs. In some embodiments, a good SSB beam for a RedCap UE is defined as an SSB beam with a measured reference signal received power (RSRP) value that is greater than a specific threshold. In some embodiments, if there is more than one type (category) of RedCap UEs, the threshold may be defined per RedCap UE category.

(Phase 2) RedCap and eMBB UEs with only one detected good SSB beam may use a legacy RO pool in an initial BWP. RedCap UEs with more than one detected good SSB beam may use a new RO pool in a different BWP than the initial BWP. One or more new mappings may be defined in the new RO pool such that one RO may be mapped to a set of SSB beams. For example, one RO may be mapped to SSB1, SSB2, and SSB3. These new mappings may be specific for RedCap UEs with more than one detected good SSB beam. Some NR specifications support mapping one RO to multiple SSB beams (e.g., in RACH-ConfigCommon, if ssb-perRACH-Occasion=2, 4, 8, 16 SSB beams). Thus, in some embodiments, and depending on the implementation details, a gNB may handle uncertainty associated with the receiver beamforming for Msg1 reception e.g., by simultaneously monitoring a set of transmission configuration indication (TCI) states in a given RO, with little or no modification.

(Phase 3) RedCap UEs with more than one detected good SSB beam may send Msg1 using a specific preamble in a selected new RO which may indicate the set of good SSB beams (e.g., beams with measured RSRP values greater than a threshold at that specific RedCap UE). Thus, the RedCap UEs may use one of these SSB beams as the transmit beam for sending Msg1.

(Phase 4) In some embodiments, if a base station (e.g., gNB) detects an overload, it may enable load balancing across the SSB beams for specific RedCap UEs with more than one detected good SSB beam. For example, a gNB may select an SSB beam from the set of good SSB beams for each RedCap UE with more than one detected good SSB beam, and inform the RedCap UE of the selected SSB beam, for example, using Msg2 via the selected SSB beam. To decode Msg2, a RedCap UE with more than one detected good SSB beam may simultaneously monitor physical downlink control channel (PDCCH) of multiple control resource set (CORESET) zero (CORESET #0) having TCI states corresponding to the set of SSB beams with measured RSRP values greater than the threshold at that specific RedCap UE.

(Phase 5) RedCap UEs with more than one detected good SSB beam may use the selected beam to transmit Msg3 to the base station.

(Phase 6) The base station may use the selected beam to transmit Msg4 to the RedCap UE with more than one detected good SSB beam.

In the detailed example embodiment of the beam adaptation method described above, as well as all other embodiments described herein, the operations are exemplary only. Some embodiments may involve various additional operations not illustrated, and some embodiments may omit some operations. Moreover, in some embodiments, the temporal order of the operations may be varied. Moreover, although some operations may be illustrated as individual operations, in some embodiments, some operations described separately may be integrated into single operations, and/or some operations described as single operations may be implemented with multiple operations.

1.2 Second Scenario

Some first embodiments may be applicable, for example, to one of the second scenarios described above in which a beam that has been detected as good by a UE during a beam sweeping operation is no longer good when the UE attempts to use it for a random access procedure. Thus, for purposes of illustration, some first embodiments may be described in the context of these scenarios. However, these embodiments may be applied in other contexts and/or scenarios as well, and are not limited to any particular contexts and/or scenarios.

A detailed example embodiment of a beam adaptation method may proceed as follows.

(Phase 1) One or more UEs may use an RO pool with a mapping in which one RO may be mapped to a set of SSB beams, for example SSB1, SSB2, and SSB3. Some NR specifications support mapping one RO to multiple SSB beams (e.g., in RACH-ConfigCommon, if ssb-perRACH-Occasion=2, 4, 8, 16 SSB beams). Thus, in some embodiments, and depending on the implementation details, a gNB may handle uncertainty associated with the receiver beamforming for Msg1 reception e.g., by simultaneously monitoring a set of transmission configuration indication (TCI) states in a given RO, with little or no modification.

(Phase 2) A UE may perform a listen before talk (LBT) sequence. After a successful LBT sequence, the UE may send Msg1 using a specific preamble in a selected RO which may indicate a set of good SSB beams with previously measured RSRP values greater than a threshold at that specific UE. The UE may use one of the good SSB beams as the transmit beam for sending Msg1 to the base station.

(Phase 3) If the base station successfully decodes a Msg1 from the UE, the base station may send a Msg2 to the UE, for example, using a RACH procedure that may apply the same TCI state used for the Msg1 transmission to the Msg2 transmission. To decode Msg2, the RedCap UE may simultaneously monitor the PDCCH of multiple CORESET #0 having the TCI states corresponding to the set of good SSB beams with previously measured RSRP values greater than the threshold at that specific UE.

In some embodiments, if the UE does not receive Msg2 from the base station, it may assume the base station did not receive Msg1 because the quality of the previously good SSB beam on which Msg1 was sent to the base station has deteriorated to a point that the beam is no longer good. Thus, the UE may use a different SSB beam from the set of previously detected good SSB beams to resend Msg1 to the base station. The UE may continuously attempt to send Msg1 using different previously detected good SSB beams until it receives Msg2 from the base station.

(Phase 4) After successfully receiving Msg2 from the base station, the UE may identify the SSB beam used to successfully transmit Msg1 and receive Msg2 and select it as the beam to use for future transmissions by the UE and the base station.

(Phase 5) The UE may use the selected beam to transmit Msg3 to the base station. In some embodiments, the selected beam may be used regardless of whether the LBT sequence was successful.

(Phase 6) The base station may use the selected beam to transmit Msg4 to the RedCap UE with more than one detected good SSB beam.

2.0 Second Embodiments: Beam Adaptation with Multiple Msg1, Each Corresponding to Individual Candidate Beams

2.1 First Scenario

Some first embodiments may be applicable, for example, to one of the first scenarios described above in which multiple UEs may attempt to access a network at the same time. Thus, for purposes of illustration, some second embodiments may be described in the context of these scenarios. However, these embodiments may be applied in other contexts and/or scenarios as well, and are not limited to any particular contexts and/or scenarios.

A detailed example embodiment of a beam adaptation method may proceed as follows.

(Phase 1) Different UEs (e.g., eMBB and RedCap UEs) that have detected more than one good SSB beam may be separated into different initial bandwidth parts (BWPs) and/or different RACH occasion (RO) pools. In some embodiments, RedCap UEs with only one detected good SSB beam may be placed in an initial BWP and/or RO pool with eMBB UEs which may opt to use a legacy RACH procedure. In some embodiments, a good SSB beam for a RedCap UE is defined as an SSB beam with a measured reference signal received power (RSRP) value that is greater than a specific threshold. In some embodiments, if there is more than one type (category) of RedCap UEs, the threshold may be defined per RedCap UE category.

(Phase 2) Each RedCap UE with more than one detected good SSB beam may repetitively send instances of Msg1 (Msg1 repetitions) in an arbitrary set of ROs, each of which may correspond to the UE's previously detected set of good SSB beams (e.g., with measured RSRP values greater than a threshold).

(Phase 3) In some embodiments, if a base station (e.g., gNB) detects an overload, it may enable load balancing across the SSB beams for specific RedCap UEs with more than one detected good SSB beam. For example, a gNB may select an SSB beam from the set of good SSB beams for each RedCap UE with more than one detected good SSB beam, and inform the RedCap UE of the selected SSB beam, for example, using Msg2 via the selected SSB beam.

(Phase 4) RedCap UEs with more than one detected good SSB beam may receive one Msg2 response on the SSB beam selected by the base station. To decode Msg2, RedCap UEs with more than one detected good SSB beam may simultaneously monitor the PDCCH of multiple CORESET #0 having the TCI states corresponding to the set of repetitions of Msg1 that the RedCap UE sent in Phase 1.

(Phase 5) RedCap UEs with more than one detected good SSB beam may use the selected beam to transmit Msg3 to the base station.

(Phase 6) The base station may use the selected beam to transmit Msg4 to the RedCap UE with more than one detected good SSB beam.

2.2 Second Scenario

Some second embodiments may be applicable, for example, to one of the second scenarios described above in which a beam that has been detected as good by a UE during a beam sweeping operation is no longer good when the UE attempts to use it for a random access procedure. Thus, for purposes of illustration, some second embodiments may be described in the context of these scenarios. However, these embodiments may be applied in other contexts and/or scenarios as well, and are not limited to any particular contexts and/or scenarios.

In some embodiments, since the UE may be unaware of which previously detected good beams are still good after the latency of a cell search, it may be suboptimal if the UE randomly selects one SSB beam out of the set of candidate good SSB beams. However, if the UE sends multiple instances of Msg1 to a base station via a set of candidate good SSB beams, the base station may determine which SSB beams are still good based on the multiple Msg1 receptions. If the UE sends repetitions of Msg1 on multiple beams that it previously determined to be good SSB beams, and the base station selects one of the multiple beams, the probability of selecting an SSB beam that is no longer good is reduced. Thus, allowing the base station to determine which SSB beams remain good after receiving multiple instances of Msg1 on the multiple beams transmitted by the UE may provide improved results.

A detailed example embodiment of such a beam adaptation method may proceed as follows.

(Phase 1) A UE may perform an LBT sequence. After a successful LBT sequence, the UE may send repetitions of Msg1 to the base station in an arbitrary set of ROs, each of which may correspond to a previously detected set of good SSB beams (e.g., with measured RSRP values greater than a threshold).

(Phase 2) The base station may respond to each Msg1 that it decodes successfully by sending a corresponding Msg2 to the UE using the RO (SSB beam) used by the UE to send the Msg1. (Alternatively, if the base station determines the Msg1 received with the RO (SSB beam) used by the UE is good, it may send a corresponding Msg2 to the UE using the RO (SSB beam).) Otherwise, the base station does not respond to Msg1.

(Phase 3) The UE may receive multiple Msg2 responses to its multiple copies of Msg1. Then UE may select one of the SSB beams used for the Msg2 responses and use the TCI state corresponding to that SSB beam to transmit Msg3 to the base station. To decode Msg2, the UE may simultaneously monitor the PDCCH of multiple CORESET #0 having the TCI states corresponding to the set of repetitions of Msg1 the UE sent in Phase 1.

(Phase 4) The UE may use the selected beam to transmit Msg3 to the base station. In some embodiments, the selected beam may be used regardless of whether the LBT sequence was successful.

(Phase 5) The base station may use the selected beam to transmit Msg4 to the UE.

3.0 Third Embodiments: SIB Signaling Traffic Information, UE Indicates Beam Selection in Msg1

Some third embodiments may be applicable, for example, to one of the first scenarios described above in which multiple UEs may attempt to access a network at the same time. Thus, for purposes of illustration, some third embodiments may be described in the context of these scenarios. However, these embodiments may be applied in other contexts and/or scenarios as well, and are not limited to any particular contexts and/or scenarios.

A detailed example embodiment of such a beam adaptation method may proceed as follows.

A base station may provide traffic information such as load and/or priority information for a set of some or all of its SSB beams to one or more UEs, for example, RedCap UEs with more than one detected good SSB beam. The traffic information may be provided, for example in the SIB information prior to a UE initiating a random access procedure.

A UE having more than one good beam may decode the traffic information (e.g., load and/or priority information) for some or all of the SSB beams in the SIB information. The UE may then select a good SSB beam intelligently based on the traffic information provided by the base station. For example, the UE may select a good SSB beam that may have a greater probability of being idle compared to congested beams based on load information provided by the base station. As another example, the UE may select a good SSB beam with no or fewer eMBB UEs to avoid congestion with other high priority traffic based on priority information provided by the base station.

The UE may inform the base station of the good beam it selected, for example, in a Msg1 transmission to the base station. In some embodiments, the remainder of the random access procedure may proceed, for example, in a manner illustrated in FIG. 1.

Beam Refinement for Random Access

In some embodiments, during an initial access, a gNB may transmit SSBs with relatively wide beams due to the limited number of SSB available. For example, the maximum number of SSB beams may be 4 or 8 in frequency range 1 (FR1), and 64 in frequency range 2 (FR2). The relatively low SS and/or PBCH beam gain of wide beams may limit the communication range of corresponding channels used during initial access. As a result, one or more channels used during initial access may create a coverage bottleneck.

In some embodiments, downlink (DL) channel coverage may generally be better than uplink (UL) channel, for example, because base stations may have more transmit antennas and/or transmission power, and/or more accurate channel estimation based on reciprocity and/or channel state information (CSI) reporting. However, even though Msg4 (e.g., a contention resolution message on PDCCH and PDSCH) is a downlink message, in some embodiments, Msg4 reception may be problematic. Msg4 failure may be caused, at least partially, because it may have fewer coverage enhancement features available than PDSCH for UE in radio resource control (RRC) connected mode. For example, in some NR specifications, Msg4 PDSCH does not support beam management or PDSCH slot aggregation because an RRC connection has not been established yet during a random access procedure for initial access.

In some embodiments, coverage may be provided by using a sufficiently low coding rate on the downlink. This may increase both the amount of energy delivered to the UE and/or maximize the coding gain. However, depending on the implementation details, this may be a relatively expensive way to achieve downlink coverage, for example, because it may consume relatively large amounts of physical resources.

In some embodiments, an NR specification may provide large amounts of array gain via digital and/or analog beamforming without increasing the amount of downlink resources, and therefore, this may be a spectrally efficient way to achieve coverage. Array gain brought by proper beamforming leads to higher received signal power and higher SNR at UE, which can improve coverage. However, to provide beamforming gain, the transmitter may need to know where to direct the energy of a narrow beam, and thus, feedback from the receiver may be needed. In some embodiments, this feedback may not be available during initial access.

Some NR specifications support CSI reporting and/or beam refinement after an RRC connection is established, which may be used for beamforming. However, during a RACH procedure, CSI feedback may not be available. Instead, a relatively coarse beam pairing may be established between a UE and the network (e.g., a base station such as a gNB) for PRACH transmission (e.g., of Msg1), and the coarse beam may be used during the remainder of the initial access procedure.

In some embodiments according to this disclosure, an early CSI report and/or beam refinement may be available during a random access procedure. Thus, depending on the implementation details, increased array gain may improve coverage of downlink channels during random access (e.g., to improve coverage for Msg4) without the increased overhead involved in low code rate PDSCH transmission.

Some of the embodiments of beam refinement methods for random access procedures disclosed herein may involve a base station (e.g., a gNB) and a UE agreeing on a pair of Tx and Rx narrowband beams that may provide acceptable or optimal communication. In some embodiments, a procedure for agreeing on such a pair may involve the transmission of an RS signal that is precoded by a Tx narrow beam and attempting to decode it with an Rx narrow beam. A procedure of determining the best combination of Tx and Rx beams may therefore be based on sending multiple RSs with different combinations of Tx and Rx beams and selecting the best combination.

Figures 4, 5:
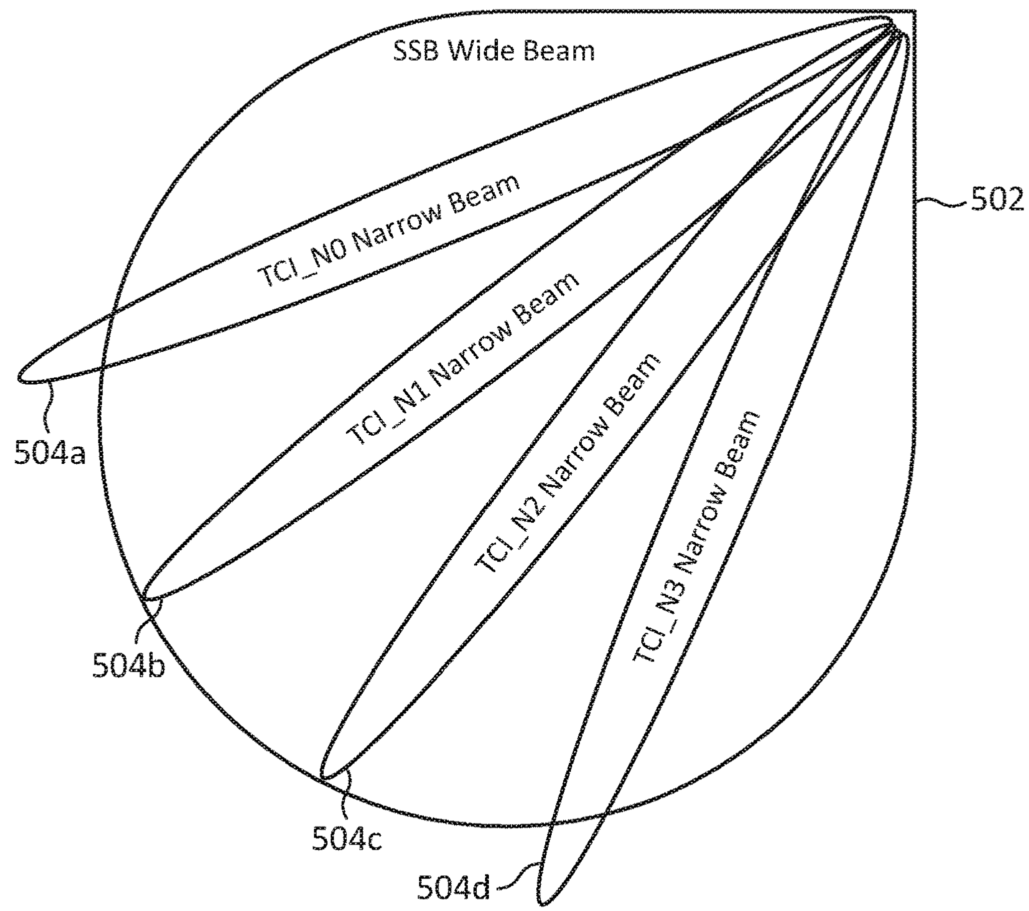
FIG. 4 illustrates an embodiment of a method for sending multiple reference signals with different combinations of transmit and receive beams for beam refinement in accordance with this disclosure.
FIG. 5 illustrates an embodiment of a narrow beam sweeping operation in accordance with this disclosure.

FIG. 4 illustrates an embodiment of a method for sending multiple reference signals with different combinations of transmit and receive beams for beam refinement in accordance with this disclosure. The embodiment illustrated in FIG. 4 may operate independently of which apparatus is the transmitter or receiver. Thus, the operation of the embodiment illustrated in FIG. 4 may be described without reference to which signal reference signal (RS) is used for the Tx beams. For purposes of implementation, however, when the Tx beams are generated by a base station, the RS signals may be implemented with CSI-RS signals, SSB signals, and/or the like. When the Tx beams are generated by a UE, the RS signals may be implemented, for example, with PRACH signals.

Referring to FIG. 4, there may be K Tx narrow beams and N Rx narrow beams, and a beam refinement procedure may attempt to determine the best Tx/Rx narrowband combination. In some embodiments, one RS signal may be transmitted after being precoded by each Tx narrow beam. This creates a set of K different RS signals, where each signal may be a differently precoded version of the original RS. Each such RS may be transmitted N times where each time a different Rx narrow beam may be used for reception. In the embodiment illustrated in FIG. 4, the RS signal labeled (RS01) may be precoded by the 1st Tx beam and received by the 1st Rx beam; the RS signal labeled (RS09) may be precoded by the 1st Tx beam and received by the 3rd Rx beam; the RS signal labeled (RS07) may be precoded by the 3rd Tx beam and received by the 2nd Rx beam. From a transmission point of view, the RS signals RS01, RS05, RS09, RS13, and RS17 may be identical signals and therefore may be considered as repetitions of the same precoded RS.

The K*N RS signals may be transmitted using different configurations in time, which may be referred to as patterns. For example, in a first pattern (Pattern 1) the reference signals may be transmitted in the order RS01, RS05, RS09, RS13, RS17, RS02, RS06, . . . , RS20. In Pattern 1, the one precoded RS signal may be repeated N times before changing the precoding. In a second pattern (Pattern 2), the reference signals may be transmitted in the order RS01, RS02, RS03, RS04, RS05, . . . , RS20. In Pattern 2, the RS signal may be transmitted in a set of K precoded RS signals in which each signal may be transmitted with different Tx precoding, and the entire set of K precoded RS signals may be repeated N times.

In Patterns 1 and 2, the entire set of K*N precoded RS signals may be transmitted. The transmission of the entire set of K*N precoded RS signals may be referred to as one beam refinement instance. Thus, a beam refinement instance may have a time duration during which the BS broadcasts a specific RS pattern which may allow the UE to identify the best UE Rx narrow beam and best BS Tx narrow beam once. In some embodiments, to obtain better accuracy in determining the best Tx/Rx beam pair, multiple instances may be used. A collection of multiple beam refinement instances may be referred to as one beam refinement occasion.

The patterns of reference signals shown in the embodiment illustrated in FIG. 4 may be used, for example, to implement any of the beam refinement methods disclosed herein.

FIG. 5 illustrates an embodiment of a narrow beam sweeping operation in accordance with this disclosure. The operation illustrated in FIG. 5 may be used, for example, to implement any of the beam refinement methods described herein. In the embodiment illustrated in FIG. 5, multiple narrow beams 504*a*, 504*b*, 504*c*, and 504*d* may correspond to a single broad beam 502 transmitted by a base station. The broad beam 502 may be based, for example, on an SSB reference signal. The narrow beams 504*a*, 504*b*, 504*c*, and 504*d* may be based, for example, on TCI_N0, TCI_N1, TCI_N2 . . . TCI_N−1 which may be transmitted in RS0, RS1, RS2 . . . RS N−1. In some embodiments, each of the narrow beams 504*a*, 504*b*, 504*c*, and 504*d* may have the same beam width and fixed relative direction and or angle within the wider angle of the SSB broad beam 502.

Figure 6:
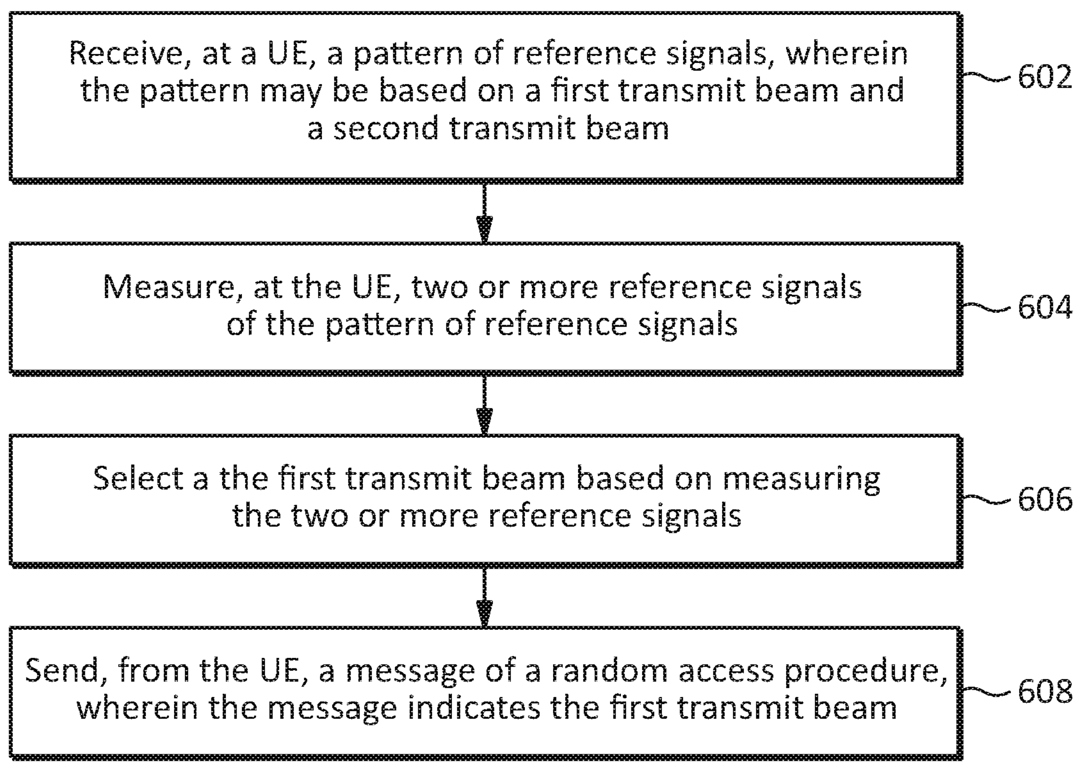
FIG. 6 illustrates an embodiment of a beam refinement method for a random access procedure with base station-based Tx narrow beam sweeping in accordance with this disclosure.

4.0 First Embodiments: Beam Refinement with Base Station (BS)-Based Tx Narrow Beam Sweeping FIG. 6 illustrates an embodiment of a beam refinement method for a random access procedure with base station-based Tx narrow beam sweeping in accordance with this disclosure. The embodiment illustrated in FIG. 6 may be used, for example, to implement any of the beam refinement methods with BS-based Tx narrow beam sweeping disclosed herein.

At operation 602, the method may receive, at a UE, a pattern of reference signals, wherein the pattern may be based on a first transmit beam and a second transmit beam. The pattern of reference signals may be, for example, a pattern of TCI narrow beams as illustrated in FIG. 5 that may be transmitted from a base station. At operation 604, the method may measure, at the UE, two or more reference signals of the pattern of reference signals. For example, the UE may measure at least two of the TCI narrow beams illustrated in FIG. 5. At operation 606, the method may select the first transmit beam based on measuring the two or more reference signals. For example, the UE may select one of the TCI narrow beams that may provide the greatest RSRP. At operation 608, the method may send, from the UE, a message of a random access procedure, wherein the message indicates the first transmit beam. For example, the UE may send Msg3 indicating to the base station that the UE selected a specific Tx beam that provided the greatest RSRP.

Figure 7:
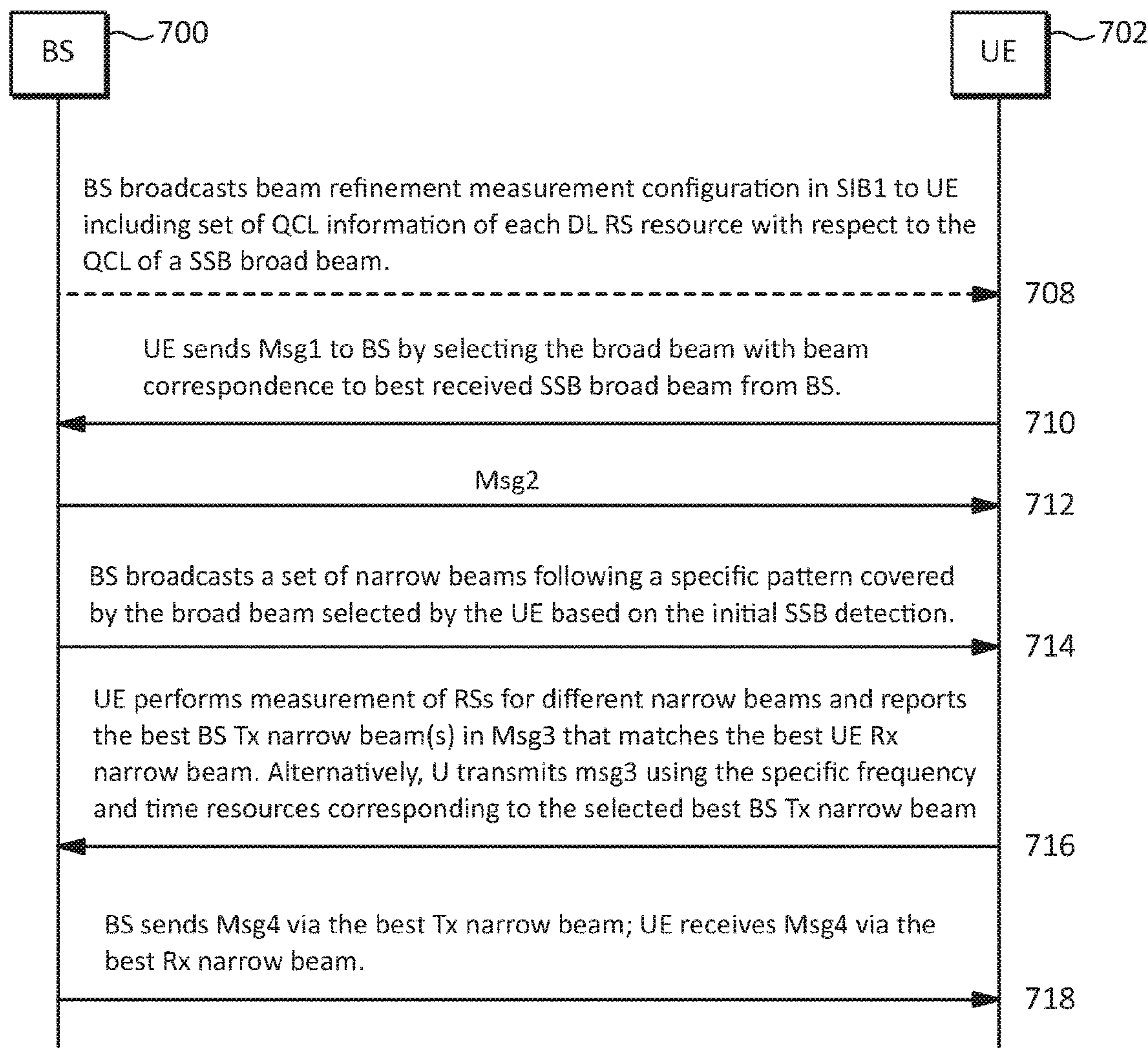
FIG. 7 illustrates another embodiment of a beam refinement method for a random access procedure with base station-based Tx narrow beam sweeping in accordance with this disclosure.

FIG. 7 illustrates another embodiment of a beam refinement method for a random access procedure with base station-based Tx narrow beam sweeping in accordance with this disclosure. At operation 708, a base station 700 may broadcast to a UE 702, beam refinement measurement configuration information in an SIB. The SIB may include a set of QCL information of each DL RS resource with respect to the QCL of corresponding SSB broad beams. At operation 710, the UE 702 may select one of the SSB broad beams with beam correspondence to the best received SSB broad beam received from the base station 700. The UE may send Msg1 with an indication of the selected SSB broad beam to the base station 700. At operation 712, the base station 700 may send Msg2 to the UE 702. The UE 702 may decode Msg2 using the broad beam selected at operation 710.

At operation 714, the base station 700 may begin narrow beam sweeping by broadcasting a set of narrow beams following a specific pattern which may be covered by the SSB broad beam selected by the UE based on the initial SSB detection. At operation 716, the UE 702 may measure the RSs of the different narrow beams, select the best BS Tx narrow beam, and report the best BS Tx narrow beam(s) to the base station 700 using Msg3. In some embodiments, the UE 702 may report the selected best BS Tx narrow beam in the content of Msg3. Alternatively, the UE 702 may report the selected best BS Tx narrow beam by transmitting Msg3 in the specific time and frequency resources corresponding to the selected best BS Tx narrow beam. At operation 718, the base station 700 may send Msg4 to the UE 702 using the selected best Tx narrow beam, and the UE 702 may receive Msg4 using the best UE Rx narrow beam determined by beam correspondence.

A detailed example embodiment of beam refinement with base station (BS)-based Tx narrow beam sweeping for a random access procedure may proceed as follows.

(Phase 1) A base station may broadcast beam refinement measurement configuration information in SIB1 to a UE. The configuration may include frequency and time resources to measure reference signals (RSs) such as CSI-RS and/or SSB. One technique for beam refinement may involve configuring a set of consecutive instances of an RS and repeating the set of consecutive RS multiple times in the time domain (before or after Msg2 reception), so as to train both the best BS Tx and UE Rx narrow beams, and to obtain sufficient accuracy for selecting the best BS Tx narrow beam.

In some embodiments, the UE may also receive information in SIB1 about the set of QCL information of each RS resource with respect to the QCL for one instance of a broad beam (e.g., an SSB broad beam). Thus, the UE may understand the QCL information of each RS narrow beam transmission with respect to the QCL information of the DL broad beam for reception at given frequency and time resources. For example, as illustrated in FIG. 5, one specific SSB beam may cover a set of narrow beams TC_N0, TCI_N1, TCI_N2 . . . TCI_N−1 which may be transmitted in RS0, RS1, RS2 . . . RS N−1, wherein each narrow beam may have the same beam width and fixed relative direction and/or angle within the angle of the SSB beam. One or more UEs may be informed via SIB1 about the mapping RS0↔TCI_N0, RS1↔TCI_N1 . . . RSN−1↔TCI_N−1. In some embodiments, the same mapping relationship may apply to any SSB beam.

(Phase 2) The UE may select the broad beam with the best beam correspondence to the received SSB broad beam from BS. The UE may then send Msg1 to the base station to indicate the selected SSB broad beam.

(Phase 3) Within one instance, the base station may broadcast consecutive reference signals such as SSB or CSI-RS following a specific pattern. For example, in a first pattern (Pattern 1) each of the RSs may first be transmitted (e.g., N times) over a unique narrow beam, and then the same set of RSs with their corresponding narrow beams may be repeated a number (e.g., K) times. As another example, in a second pattern (Pattern 2) each RS may be transmitted in the time domain repetition K times with the same narrow beam specific to that RS, which may then be repeated N times in the time domain for each of the other unique narrow beams. For example, in an implementation having K RS indexes and K narrow beams, then pattern 2 may be implemented as (Beam 1, Beam 1, Beam1, Beam 2, Beam 2, Beam 2, . . . . Beam K, Beam K, Beam K). As another example, a third pattern (Pattern 3) may be implemented such that each RS may be transmitted consecutively without repetition with a unique narrow beam specific to that RS. Finally, within a single occasion, a base station may repeat broadcasting the same RS pattern multiple times in the time domain either before or after transmitting Msg2. The set of narrow beams may be covered by the broad beam which may be selected by the UE based on the initial SSB detection. The frequency and time resources used to transmit the RSs may be configured, for example, in SIB1.

Alternatively, the base station may broadcast a set of copies of RAR messages and the RSs over a set of narrow beams covered by the selected broad beam based on UE initial SSB detection. In such an embodiment, one RS and one copy of the RAR message may be transmitted over one narrow beam.

(Phase 4) The UE may initially randomly select a UE Rx narrow beam that is covered by the UE Rx broad beam selected from the initial SSB detection. The UE may then perform a measurement of the RSs of different narrow beams in one time instance and select the narrow beam with the best received RSRP. Finally, the UE may measure the RSs of different narrow beams over one beam refinement instance or occasion to achieve sufficient accuracy for selecting the best BS Tx narrow beam and the best UE Rx narrow beam. The UE may then report the best BS Tx narrow beam that matches the best UE Rx narrow beam to the base station using Msg3. Alternatively, instead of explicitly reporting the best BS Tx narrow beam in Msg3, the UE may transmit Msg3 using the specific frequency and time resources (received as part of UL grant) that may correspond to the selected best BS Tx narrow beam.

(Phase 5) By applying the best UE Rx narrow beam, the UE may decode the Msg2/RAR transmitted by the base station using the broad beam selected in the initial SSB detection. If the Msg2/RAR decoding occurs before transmission of the RSs, the broad beam selected in the initial SSB detection may be used as the UE Rx beam. To indicate the UL grant for Msg3, the UL grant in Msg2 may include a frequency offset to the frequency resource of Msg2 and a pre-defined time offset for beam refinement to the time resource for transmitting Msg2 added to a dynamic time offset of the selected resources for Msg3. If Msg2 occurs after multiple RS instances, it may affect the Msg2 monitoring window. For example, SIB1 may add an additional time offset for performing beam refinement to a Msg2 monitoring window. Thus, a pre-defined time offset for beam refinement may be indicated in SIB1. If Msg2/RAR is repeated over every narrow beam, the UE may combine the multiple received copies of RAR and improve the reception reliability and/or SNR.

(Phase 6) The UE may transmit Msg3 to the base station by selecting the best UE Tx narrow beam using beam correspondence based on the identified best UE Rx narrow beam. The Msg3 may report the RS index (or indexes) corresponding to the best BS Tx narrow beam or beams from the base station.

(Phase 7) The base station may send Msg4 using the best BS Tx narrow beam, and the UE may receive Msg4 using the best UE Rx narrow beam.

Figure 8:
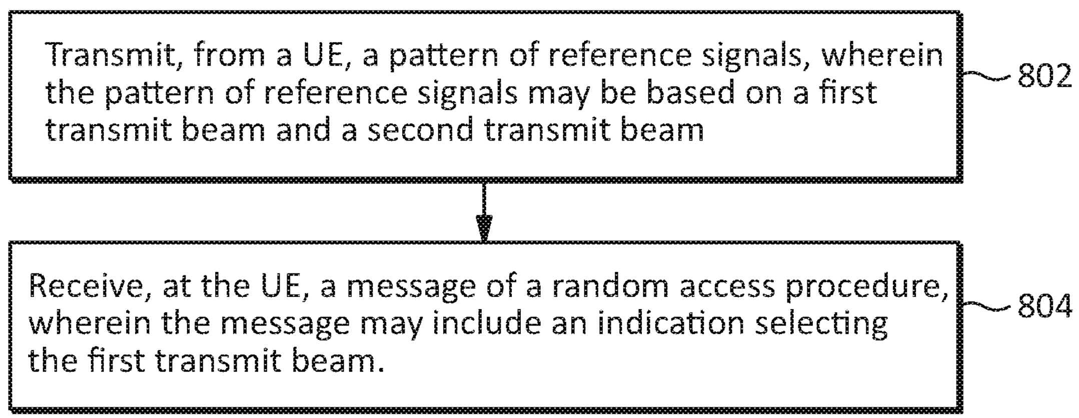
FIG. 8 illustrates another embodiment of a beam refinement method for a random access procedure in accordance with this disclosure.

5.0 Second Embodiments: Beam Refinement with UE-Based Tx Narrow Beam Sweeping FIG. 8 illustrates another embodiment of a beam refinement method for a random access procedure in accordance with this disclosure. The embodiment illustrated in FIG. 8 may be used, for example, to implement any of the beam refinement methods with UE-based Tx narrow beam sweeping disclosed herein.

At operation 802, the method may transmit, from a UE, a pattern of reference signals, wherein the pattern of reference signals may be based on a first transmit beam and a second transmit beam. For example, the UE may transmit a pattern of narrow beam references signals such as those illustrated in FIG. 5, however, using repetitions of Msg1 as a reference signal based on PRACH resources. At operation 804, the method may receive, at the UE, a message of a random access procedure, wherein the message may include an indication selecting the first transmit beam. For example, the message may be implemented as a Msg2.

Figure 9:
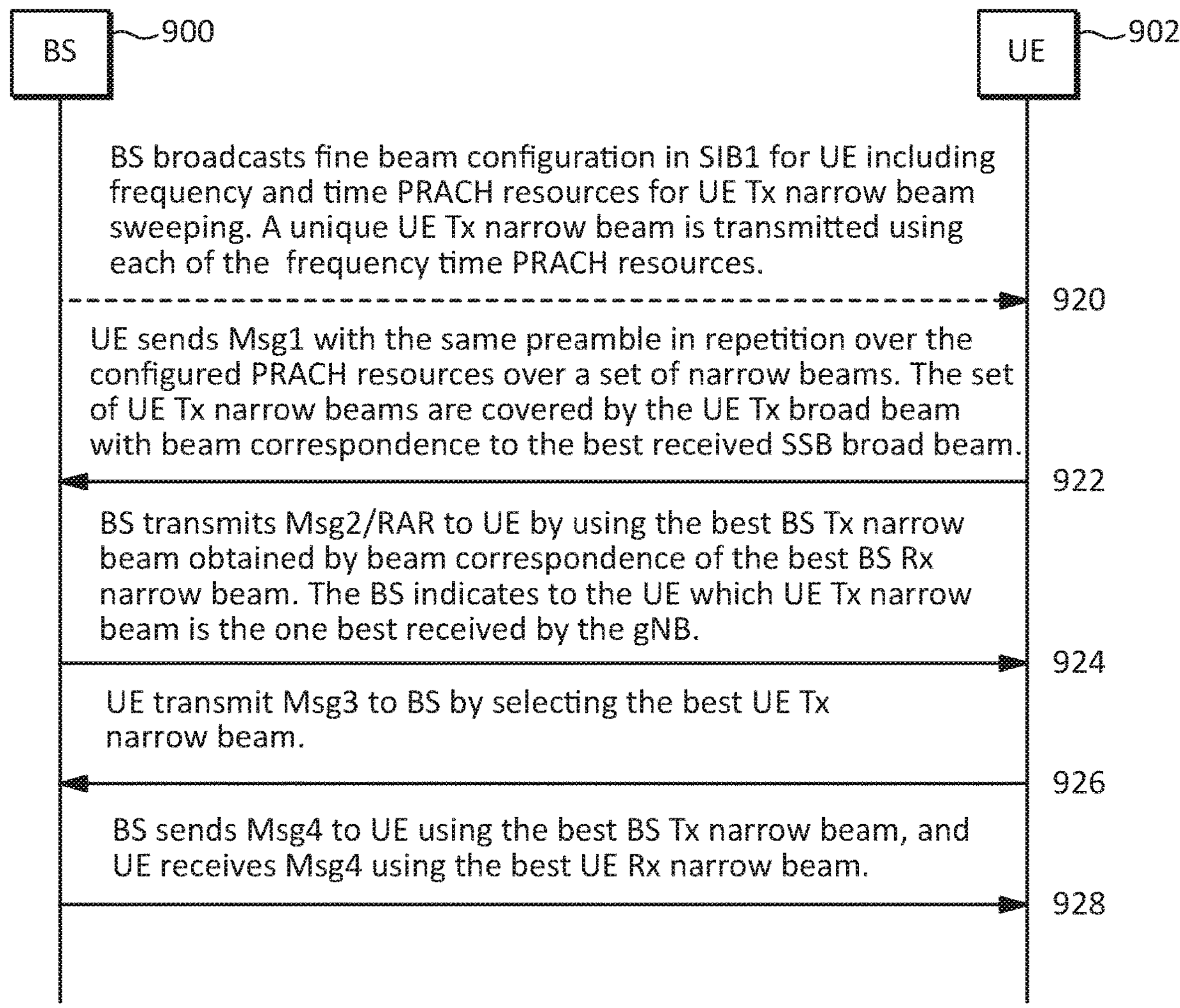
FIG. 9 illustrates another embodiment of a beam refinement method for a random access procedure with UE-based Tx narrow beam sweeping in accordance with this disclosure.

FIG. 9 illustrates another embodiment of a beam refinement method for a random access procedure with UE-based Tx narrow beam sweeping in accordance with this disclosure. At operation 920, a base station 900 may broadcast fine (narrow) beam configuration information in SIB1 to a UE 902. The configuration information may include frequency and time PRACH resources for UE Tx narrow beam sweeping. A unique UE Tx narrow beam may be transmitted using each of these frequency and time PRACH resources. At operation 922, the UE 902 may transmit Msg1 with the same preamble in repetition over the configured PRACH resources over a set of narrow beams. The set of UE Tx narrow beams may be covered by the UE Tx broad beam with beam correspondence to the best received SSB broad beam.

At operation 924, the base station 900 may determine the best BS Tx narrow beam by beam correspondence with the best BS Rx narrow beam. The base station 900 may transmit Msg2/RAR to the UE 902 using the best BS Tx narrow beam, thereby indicating to the UE 902 which UE Tx narrow beam is the one best received by the base station 900. At operation 926, the UE 902 may transmit Msg3 to the base station 900 using the selecting best UE Tx narrow beam. At operation 928, the base station 900 may send Msg4 to the UE 902 using the best BS Tx narrow beam, and the UE may receive Msg4 using the best UE Rx narrow beam.

A detailed example embodiment of beam refinement with UE-based Tx narrow beam sweeping for a random access procedure may proceed as follows.

(Phase 1) The base station may broadcast beam refinement measurement configuration information to a UE in SIB1, wherein the configuration information may include frequency and time PRACH resources for UE Tx narrow beam sweeping. A unique UE Tx narrow beam may be transmitted using each of the frequency and time PRACH resources. The set of narrow beams over these configured PRACH resources may be covered by the same SSB broad beam selected by the UE in an initial SSB detection. Each of the frequency and time PRACH resources may uniquely identify QCL/TCI state information of a Tx narrow beam using the PRACH resource with respect to the QCL/TCI state information of a selected Tx broad beam in the initial SSB detection.

In a first specific pattern of a set of narrow beams, within one instance, the UE may first send Msg1 in repetition over consecutive PRACH resources in the time domain, first with a set of unique narrow beams, and then repeating the same set of unique narrow beams in the time domain for multiple times to select both the best UE Tx and BS Rx narrow beam once. In a second pattern, the UE may transmit message 1 in repetition in the time domain M times with the same unique narrow beam, which may then be repeated in the time domain for each of the other unique narrow beams. For example, in an embodiment having K narrow beams, the second pattern (Pattern 2) may proceed as Beam 1, Beam 1, Beam1, Beam 2, Beam 2, Beam 2, . . . Beam K, Beam K, Beam K. In a third pattern (Pattern 3) each message 1 may be transmitted consecutively without repetition with a unique narrow beam. Finally, within one occasion, the UE may repeat the same Msg1 transmission pattern of one instance multiple times in the time domain to achieve sufficient accuracy for selecting the best UE Tx and BS Rx narrow beams. In some embodiments, the UE may not power ramp or change the beam pattern over multiple instances or within one occasion, since using the same beam pattern and/or power over multiple instances or one occasion may only or primarily be to improve the accuracy of beam refinement. Moreover, a UE may not be expected to monitor Msg2 after every PRACH instance. Instead, a UE may only be expected to monitor Msg2 after the above defined one occasion of Msg1 transmissions or pre-defined multiple PRACH instances.

(Phase 2) The UE may send Msg1 to the base station with the same preamble in repetition over the configured PRACH resources over a set of narrow beams as described above. The set of UE Tx narrow beams may be covered by the UE Tx broad beam with beam correspondence to the best received SSB broad beam from the base station.

(Phase 3) The base station may receive Msg1 in repetition over the configured PRACH resources. The base station may first select the PRACH resources that provide the best reception quality within one instance to select the best UE Tx narrow beam. Then, over multiple repeated instances, the base station may select the PRACH resources that provide the best reception quality to select the best BS Rx narrow beam.

(Phase 4) The base station may transmit Msg2/RAR to the UE using the best BS Tx narrow beam obtained by beam correspondence with the best BS Rx narrow beam. In Msg2/RAR, the base station may indicate to the UE which UE Tx narrow beam is the best received by the base station. In some embodiments, the base station may provide the indication to the UE, for example, by including an ID of the PRACH/PRACH occasion used by the UE for the best UE Tx narrow beam. This may allow the UE to determine which UE Tx narrow beam has been determined to be the best one. Alternatively, the base station may provide the indication to the UE in the DCI scheduling Msg2. For example, such an indication may be implemented using one or more reserved bits in the downlink control information (DCI) format 1_0 used for Msg2 scheduling.

(Phase 5) By initially applying an arbitrary Rx narrow beam or broad beam, the UE may decode the Msg2/RAR transmitted by the base station. Thus, the UE may determine the best UE Tx narrow beam and the best UE Rx narrow beam by beam correspondence.

(Phase 6) The UE may transmit Msg3 to the base station using the best UE Tx narrow beam. The base station may receive Msg3 by applying the best BS Rx narrow beam.

(Phase 7) The base station may send Msg4 to the UE using the best BS Tx narrow beam, and the UE may receive Msg4 using the best UE Rx narrow beam.

In some embodiments, while performing UE-based Tx beam refinement, the UE may transmit multiple PRACH signals, wherein each PRACH signal may be precoded with particular narrowband beamforming weights. The UEs may use a CSI-RS signal transmitted by the UE to obtain these precoding weights. For example, the base station may send an early CSI-RS for the UEs in a serving cell. Specifically, the base station may RRC configure a cell-specific non-zero-power (NZP) CSI-RS to allow UEs in RRC IN_ACTIVE or RRC_IDLE modes to obtain CSI for precoding weights determination. In some embodiments, this signal may be configured as a periodic signal that may be used by UEs without the need for signaling a request for CSI-RS. Alternatively, the signal may be configured as a semi-persistent or aperiodic signal in which a UE may be required to transmit a signal requesting the CSI-RS. The UEs may request CSI-RS, for example, by sending one or more PRACH preambles in dedicated PRACH resources configured by the base station for the purpose of requesting CSI-RS. The resources may be configured, for example, in a cell-specific manner, in which case the UEs contend on sending a PRACH preamble with possible collisions. In some embodiments, the base station may not necessarily need to identify UEs that are requesting CSI-RS. For example, as long as there is a preamble transmitted in the dedicated resources by one UE, the base station may send the CSI-RS.

Figure 10:
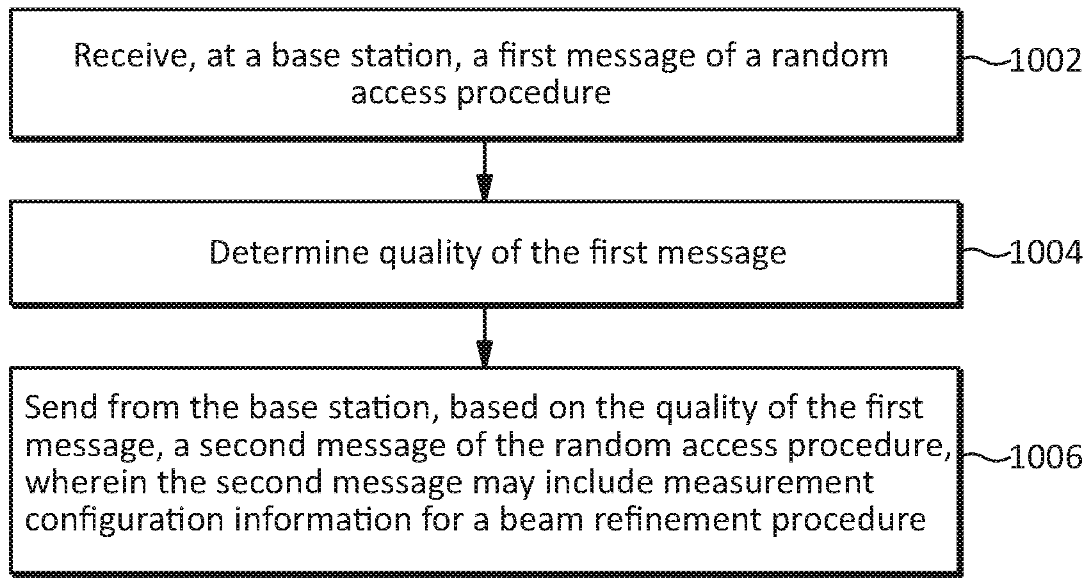
FIG. 10 illustrates another embodiment of a beam refinement method for a random access procedure in accordance with this disclosure.

6.0 Third Embodiments: Msg2 Carries Beam Refinement Measurement Configuration Information FIG. 10 illustrates another embodiment of a beam refinement method for a random access procedure in accordance with this disclosure. The embodiment illustrated in FIG. 10 may be used, for example, to implement any of the beam refinement methods in which Msg2 may carry beam refinement measurement configuration information disclosed herein. At operation 1002, the method may receive, at a base station, a first message of a random access procedure. At operation 1004, the method may determine a quality of the first message. At operation 1006, the method may send from the base station, based on the quality of the first message, a second message of the random access procedure, wherein the second message may include measurement configuration information for a beam refinement procedure.

A detailed example embodiment of beam refinement for a random access procedure in which Msg2 may carry measurement configuration information may proceed as follows.

(Phase 1) A base station may receive a Msg1 from a UE. Based on the reception quality of the Msg1, the base station may decide whether to perform a beam refinement operation for subsequent message 3 and message 4 transmissions.

(Phase 2) If the base station decides to conduct a beam refinement operation, it may send the beam refinement measurement configuration to the UE in Msg2. The content of the configuration information, for example, may be similar to that described in the first embodiments of beam refinement for random access above.

(Phase 3) The UE may decode the Msg2 and then perform beam refinement, for example, as in Phase 4 of the first embodiments. Depending on the implementation details, the UE may obtain the best BS Tx narrow beam and UE Rx narrow beam. Moreover, to indicate the UL grant for Msg3 in Msg2, a set of pre-defined time offset values indicated in SIB1 may be used for beam refinement between Msg2 and Msg3. The base station may select one of the pre-defined time offset values and indicates it in Msg2.

(Phase 4) By applying beam correspondence, the UE may select the best UE Tx narrow beam based on the identified best UE Rx narrow beam. The UE may indicate this selection to the base station by transmitting Msg3 to the base station. For example, the Msg3 may report the one or more RS indexes corresponding to the one or more best BS Tx narrow beams from the base station.

(Phase 5) The base station may send Msg4 using the best BS Tx narrow beam, and the UE may receive Msg4 using the best UE Rx narrow beam.

7.0 Fourth Embodiments: Beam Refinement Before Msg1

Figure 11:
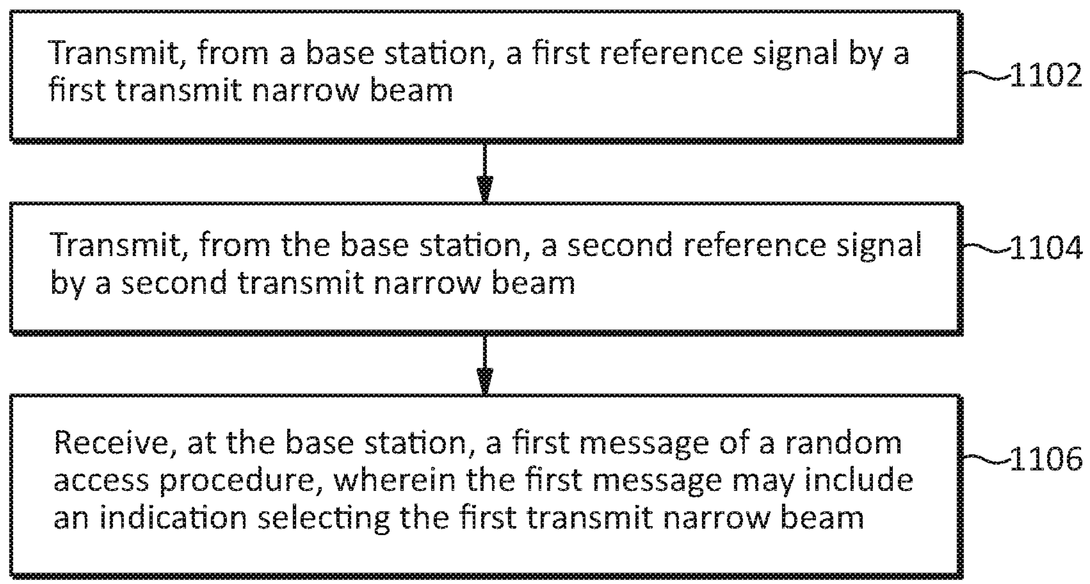
FIG. 11 illustrates another embodiment of a beam refinement method for a random access procedure in accordance with this disclosure.

FIG. 11 illustrates another embodiment of a beam refinement method for a random access procedure in accordance with this disclosure. The embodiment illustrated in FIG. 11 may be used, for example, to implement any of the beam refinement methods in which beam refinement may be performed before Msg1. At operation 1102, the method may transmit, from a base station, a first reference signal by a first transmit narrow beam. At operation 1104, the method may transmit, from the base station, a second reference signal by a second transmit narrow beam. At operation 1106, the method may receive, at the base station, a first message of a random access procedure, wherein the first message may include an indication selecting the first transmit narrow beam.

A detailed example embodiment of beam refinement for a random access procedure in which beam refinement may be performed before Msg1 may proceed as follows. The procedure for initial access may specify specific ROs for coverage-enhancement UEs, for example, because the messaging may be different than the Msg1, Msg2, Msg3, and Msg4 random access procedure, and because the base station may not know the UE capabilities. In such an embodiment, the base station may sweep the narrow beam RSs (e.g., CSI-RSs) before Msg1. Such an embodiment may implement a mapping between narrow beam RS and RO, for example, similar to SSB to RO mapping, which may be configured in SIB1. The coverage-enhancement UE may perform measurements of the transmitted narrowbeam RSs (e.g., CSI-RS) before sending Msg1. Based on the measurements, the UE may select the best measured DL narrow beam with the best signal to interference plus noise ratio (SINR). The UE may also choose the corresponding preamble and/or RO to use to send Msg1 to the base station. Based on the chosen preambles and/or RO for Msg1, the UE may indicate the selected narrow beam to the base station.

User Equipment

Figure 12:
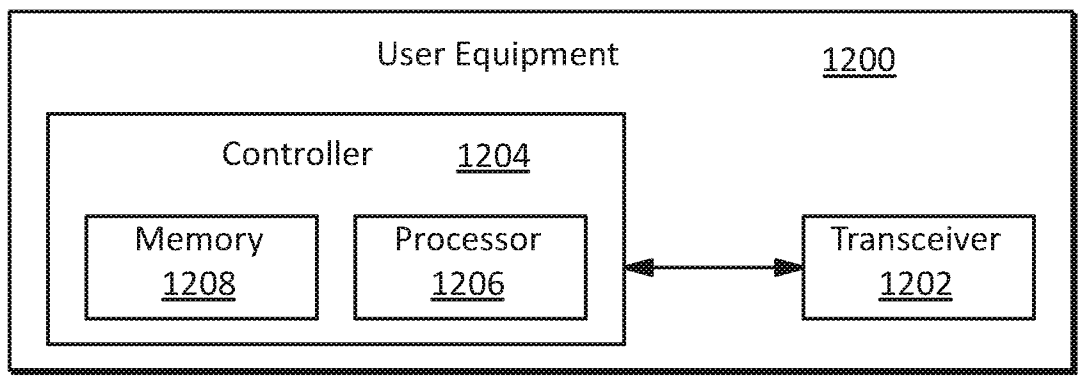
FIG. 12 illustrates an example embodiment of a user equipment (UE) in accordance with this disclosure.

FIG. 12 illustrates an example embodiment of a user equipment (UE) in accordance with this disclosure. The embodiment 1200 illustrated in FIG. 12 may include a radio transceiver 1202 and a controller 1204 which may control the operation of the transceiver 1202 and/or any other components in the UE 1200. The UE 1200 may be used, for example, to implement any of the functionality described in this disclosure. The transceiver 1202 may transmit/receive one or more signals to/from a base station, and may include an interface unit for such transmissions/receptions. The controller 1204 may include, for example, one or more processors 1206 and a memory 1208 which may store instructions for the one or more processors 1206 to execute code to implement any of the functionality described in this disclosure. For example, the UE 1200 and/or the controller 1204 may be used to implement functionality relating to beam adaptation and/or beam refinement for random access.

Base Station

Figure 13:
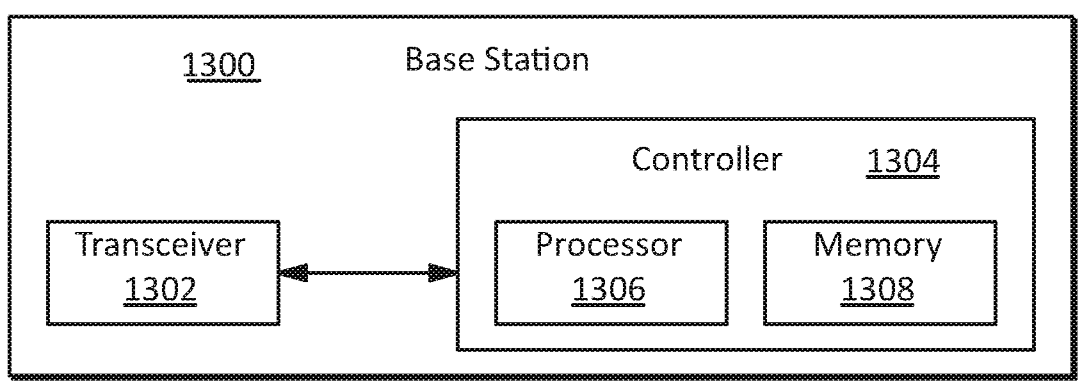
FIG. 13 illustrates an example embodiment of a base station in accordance with this disclosure.

FIG. 13 illustrates an example embodiment of a base station in accordance with this disclosure. The embodiment 1300 illustrated in FIG. 13 may include a radio transceiver 1302 and a controller 1304 which may control the operation of the transceiver 1302 and/or any other components in the base station 1300. The base station 1300 may be used, for example, to implement any of the functionality described in this disclosure. The transceiver 1302 may transmit/receive one or more signals to/from a user equipment, and may include an interface unit for such transmissions/receptions. The controller 1304 may include, for example, one or more processors 1306 and a memory 1308 which may store instructions for the one or more processors 1306 to execute code to implement any of the base station functionality described in this disclosure. For example, the base station 1300 and/or the controller 1304 may be used to implement functionality relating to network initiated beam reconfiguration for load balancing and/or interference management, and/or the like.

In the embodiments illustrated in FIGS. 12 and 13, the transceivers 1202 and 1302 may be implemented with various components to receive and/or transmit RF signals such as amplifiers, filters, modulators and/or demodulators, A/D and/or DA converters, antennas, switches, phase shifters, detectors, couplers, conductors, transmission lines, and/or the like. The controllers 1204 and 1304 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), application specific integrated circuits (ASICs), systems on chip (SOC), state machines, data converters such as ADCs and DACs, and/or the like. Full or partial software implementations may include one or more processor cores, memories, program and/or data storage, and/or the like, which may be located locally and/or remotely, and which may be programmed to execute instructions to perform one or more functions of the controllers. Some embodiments may include one or more CPUs such as complex instruction set computer (CISC) processors such as x86 processors and/or reduced instruction set computer (RISC) processors such as ARM processors, and/or the like, executing instructions stored in any type of memory.

The embodiments disclosed herein may be described in the context of various implementation details, but the principles of this disclosure are not limited to these or any other specific details. Some functionality has been described as being implemented by certain components, but in other embodiments, the functionality may be distributed between different systems and components in different locations. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure. Various organizational aids such as section headings and the like may be provided as a convenience, but the subject matter arranged according to these aids and the principles of this disclosure are not defined or limited by these organizational aids.

Since the inventive principles of this patent disclosure may be modified in arrangement and detail without departing from the inventive concepts, such changes and modifications are considered to fall within the scope of the following claims.

The invention claimed is:

1. A method for random access in a communication network, the method comprising:

receiving, at a user equipment (UE), beam-specific traffic information for a plurality of transmit beams, wherein the beam-specific traffic information includes at least one of the following:

beam-specific loading information indicating a level of congestion on a corresponding transmit beam, and beam-specific priority information indicating a priority level of traffic carried over the corresponding transmit beam;

selecting, at the UE, a first transmit beam of the plurality of transmit beams and a second transmit beam of the plurality of transmit beams based on the beam-specific traffic information for the first and the second transmit beams;

transmitting, from the UE, a pattern of reference signals as part of a request message of a random access procedure, wherein the pattern of reference signals is transmitted using the first transmit beam and the second transmit beam; and receiving, at the UE, a response message of the random access procedure, wherein the response message comprises an indication selecting the first transmit beam.

2. The method of claim 1, the method further comprising sending, from the UE, a connection request message of the random access procedure by the first transmit beam.

3. The method of claim 1, further comprising selecting, based on correspondence with the first transmit beam, a UE receive beam.

4. The method of claim 3, further comprising receiving, at the UE, a contention resolution message by the UE receive beam.

5. The method of claim 1, wherein transmitting the pattern of reference signals comprises:

transmitting a first instance of the request message of the random access procedure by the first transmit beam; and transmitting a second instance of the request message by the second transmit beam.

6. The method of claim 1, further comprising receiving configuration information at the UE, wherein transmitting the pattern of reference signals is based on the configuration information.

7. The method of claim 6, wherein the configuration information is received in a system information block (SIB).

8. The method of claim 6, wherein the configuration information comprises resources for transmitting the pattern of reference signals.

9. The method of claim 8, wherein the resources comprise frequency and time resources for a physical random access channel (PRACH).

10. The method of claim 6, further comprising determining, at the UE, a transmit broad beam of a base station, wherein the first transmit beam and the second transmit beam are narrow transmit beams corresponding to the transmit broad beam.

11. The method of claim 10, wherein the configuration information comprises quasi-colocation (QCL) information for the pattern of reference signals based on QCL information for the transmit broad beam.

12. The method of claim 1, further comprising:

receiving, at a base station, two or more reference signals of the pattern of reference signals;

measuring, at the base station, the two or more reference signals of the pattern of reference signals;

selecting, at the base station, the first transmit beam based on the measuring; and sending from the base station, based on the selecting, the response message to the UE.

13. The method of claim 12, wherein:

the transmitting comprises transmitting a first instance of the pattern of reference signals;

the receiving at the base station comprises receiving a first instance of the two or more reference signals;

the measuring comprises measuring the first instance of the two or more reference signals; and wherein the method further comprises:

transmitting, from the UE, a second instance of the pattern of reference signals;

receiving, at the base station, a second instance of the two or more reference signals; and measuring, at the base station, the second instance of the two or more reference signals; and the selecting at the base station is further based on measuring the second instance of the two or more reference signals.

14. The method of claim 1, further comprising:

transmitting the pattern of reference signals based on precoding information; and receiving, at the UE, the precoding information.

15. The method of claim 1, wherein:

the first transmit beam is based on a first reference signal identified by a first transmission control information (TCI) state; and the second transmit beam is based on a second reference signal identified by a second TCI state.

16. The method of claim 1, wherein:

the first beam is based on a first reference signal identified by first quasi colocation (QCL) information; and the second beam is based on a second reference signal identified by second QCL information.

* * * * *